United States Patent [19]

Hilton et al.

[11] Patent Number: 5,798,748
[45] Date of Patent: Aug. 25, 1998

[54] FORCE AND TORQUE CONVERTER WITH IMPROVED DIGITAL OPTICAL SENSING CIRCUITRY

[75] Inventors: John Hilton, Bedford; Stephan Roundtree, Dunstable; Hal Avery, Needham, all of Mass.

[73] Assignee: Spacetec IMC Corporation, Lowell, Mass.

[21] Appl. No.: 481,650

[22] Filed: Jun. 7, 1995

[51] Int. Cl.$^6$ .................................................. G06G 5/00
[52] U.S. Cl. .......................... 345/156; 345/165; 345/166
[58] Field of Search ............................... 345/156, 157, 345/162, 163, 165, 166

[56] References Cited

U.S. PATENT DOCUMENTS

| | | |
|---|---|---|
| 3,561,263 | 2/1971 | Ward et al. |
| 3,628,394 | 12/1971 | Keatinge ............................ 74/471 XY |
| 3,640,130 | 2/1972 | Spescha et al. |
| 3,693,425 | 9/1972 | Starita et al. |
| 3,921,445 | 11/1975 | Hill et al. |
| 4,178,799 | 12/1979 | Schmieder et al. |
| 4,488,441 | 12/1984 | Ramming |
| 4,550,617 | 11/1985 | Fraignier et al. |

(List continued on next page.)

FOREIGN PATENT DOCUMENTS

| | | |
|---|---|---|
| 176173 | 4/1986 | European Pat. Off. |
| 0227432 | 7/1987 | European Pat. Off. |
| 2211137 | 7/1974 | France |
| 218458 | 2/1985 | German Dem. Rep. |
| 224930 | 7/1985 | German Dem. Rep. |
| 957980 | 2/1957 | Germany |
| 2926213 | 6/1979 | Germany |

(List continued on next page.)

OTHER PUBLICATIONS

S. Sugiyama et al. "A 32×32 (1k)–Element Silicon Pressure–Sensor Array with CMOS Processing Circuits," Jan. 1992, pp. 64–75, Electronics & Communications in Japan, Part 2; Electronics, vol. 7, No. 1.

T. Kawashima et al. "An Optical Tactile Sensor Usign the CT Reconstruction Method." Oct. 1987, pp. 35–43, Electronics & Communications in Japan/Part II: Electronics, vol. 7, No. 10.

(List continued on next page.)

*Primary Examiner*—Richard Hjerpe
*Assistant Examiner*—Xu-Ming Wu
*Attorney, Agent, or Firm*—Wolf, Greenfield & Sacks, P.C.

[57] ABSTRACT

An apparatus provides an electronic signal in response to at least one of an applied force and an applied torque. The apparatus includes a detection device that detects movement of a movable member relative to a base, and provides the electronic signal, by driving a plurality of first sensor components. The detection device includes a control circuit having a first output that provides a digital control signal, and a first input for receiving a comparison signal, and a second output that provides the detection signal according to the comparison signal; a digital-to-analog converter having an input coupled to the first output of the control circuit, and an output that provides the drive signal in response to the digital control signal; and a measuring circuit having a first input coupled to the output of the digital-to-analog converter, a second input that receives a result signal from a plurality of second sensor components co-acting with the plurality of first sensor components, and an output coupled to the first input of the control circuit that provides the comparison signal, the plurality of first sensor components and the plurality of second sensor components co-acting with the controlling mechanism. The detection device is constructed using a method of constructing a printed circuit board assembly which includes the steps of: (A) forming a series of grooves in first PCB material to produce a bending region thereon; (B) bonding second PCB material to the first PCB material to produce a intermediate assembly, the second PCB material having an electrically conductive layer on one side; and (C) bending the intermediate assembly into the printed circuit board assembly.

21 Claims, 9 Drawing Sheets

U.S. PATENT DOCUMENTS

| | | |
|---|---|---|
| 4,573,362 | 3/1986 | Amlani . |
| 4,589,810 | 5/1986 | Heindl et al. . |
| 4,607,159 | 8/1986 | Goodson et al. . |
| 4,647,915 | 3/1987 | Shank et al. ............................ 345/157 |
| 4,680,465 | 7/1987 | Stevens . |
| 4,782,327 | 11/1988 | Kley et al. . |
| 4,843,307 | 6/1989 | Ichijyo ................................ 324/103 P |
| 4,950,116 | 8/1990 | Nishida . |
| 5,222,400 | 6/1993 | Hilton ................................ 73/862.05 |
| 5,252,976 | 10/1993 | Miho et al. ............................. 341/163 |
| 5,428,369 | 6/1995 | Pranger et al. ......................... 345/166 |
| 5,493,919 | 2/1996 | Frank et al. . |
| 5,557,076 | 9/1996 | Wieczorek et al. ....................... 178/19 |
| 5,577,848 | 11/1996 | Bowen ................................... 345/157 |

FOREIGN PATENT DOCUMENTS

| | | |
|---|---|---|
| 209519 | 9/1982 | Germany . |
| 3420884 | 6/1984 | Germany . |
| 3835955 | 5/1989 | Germany . |
| 95331 | 5/1985 | Japan . |
| 62-233822 | 10/1987 | Japan . |
| 974155 | 5/1981 | U.S.S.R. . |
| 20967777 | 10/1982 | United Kingdom . |
| 2115935 | 9/1983 | United Kingdom . |
| WO93/04348 | 3/1993 | WIPO . |
| WO96/14968 | 5/1996 | WIPO . |

OTHER PUBLICATIONS

S.L. Sinelnikov, "Photometer e.g. for chemical and textile industries—has photoreceiver, calibration amplifier and digital control circuit," 13.04.84–SU–725684, Bul. 47/23.12.85 (4pp Dwg. No. 1/1).

A.E. Brennemann, Jr., R.L. Hollis, Jr. and R.H. Taylor, "Robot Position and Orientation Sensor," vol. 26, No. 9, pp. 4457–4462, Feb. 1984, IBM Technical Disclosure Bulletin.

FORCE AND TORQUE CONVERTER WITH IMPROVED DIGITAL OPTICAL SENSING CIRCUITRY

FIELD OF THE INVENTION

The present invention relates to a force and torque converter that is useful in a wide field of activities, particularly those in which a manual motion is to be converted into an electronic representation for use as a control signal.

BACKGROUND TO THE INVENTION

There is a need for a sensing system to monitor applied forces and torques. An example of such a sensor system is described in U.S. Pat. No. 3,921,445 to Hill and Sword. In that specification, the manipulator is of a hand-like form comprising a pair of jaws, which are relatively pivotally movable under operation of an electric motor. The manipulator includes a wrist. Sensing means are provided for sensing the magnitude and direction of applied forces and torques. The applied force is decomposed into components corresponding to three mutually orthogonal axes intersecting at the wrist. The sensing means include a series of sensors, extending around the longitudinal axis of the manipulator.

To date, torque and force converters have been largely limited to sophisticated computer applications and have generally been prohibitively expensive for general computer use. In particular, prior art force converters have high manufacturing costs because of the sensing mechanisms and construction requirements that are necessary.

U.S. Pat. No. 4,811,608 issued Mar. 14, 1989, Force and Torque Converter, is hereby incorporated by reference.

Joysticks, track balls, and mice are commonly used to convert a manual motion into an electronic representation to be used by the computer system. Frequently, these devices are employed as pointing instruments to move a cursor or otherwise manipulate a graphical image on the computer screen.

There are two major types of prior art mice: the mechanical mouse, and the optical mouse. Both types are displacement sensing devices. As such, both types have the disadvantage in that they must frequently be lifted and reoriented to allow further movement. For example, the user's range of comfortable motion is often reached before the user is finished "dragging" a graphical object across the screen. Consequently, the user must stop the operation and lift and reorient the mouse, before resuming the desired task. In addition, small work space environments exacerbate this annoying feature, as there is less space in which to displace the mouse.

Besides these ergonomic disadvantages, mechanical mice require regular cleaning and can slip during operation. This results in inconsistent operation. Most optical mice require an optical pad to operate.

Further, most existing computer input devices are displacement or velocity sensing devices, not force sensing. It is believed that users prefer to have the sensitivity characteristics of the input device (e.g., precision and quickness of pointer movement) change in relation to the applied force and not in relation to displacement. Though it is recognized that some force and torque converters have been used, these are costly and therefore limited to relatively sophisticated systems.

The dynamics of a displacement sensing device depend on many inputs. Two different applied forces can result in the same velocity or displacement of the device depending on these other input variables, such as the weight of a user's hand. Thus, there is no functional relationship between the displacement and the applied force. Consequently, it is extremely difficult, if not impossible, for a displacement sensing device to implement desirable sensitivity characteristics relating the applied force to the output of the apparatus.

Additionally, existing mice, track balls, and joysticks provide limited information to the computer systems. The planar translational movement of the device is usually decomposed into an X component and a Y component (X and Y being orthogonal axes within the sensed plane). Track balls perform an analogous decomposition of the angular movement of the ball. The decomposed information is then used by the computer system to manipulate a pointer or similar graphical object. Consequently, only two basic pieces of information are generally provided, the X component and the Y component, thus offering only two degrees of programming freedom for the applications developer. If the device could sense a rotational component about an axis, in addition to sensing the planar components, a third degree of programming freedom could be offered to applications developers. This additional degree of freedom could then be utilized to add functionality to the applications.

Some devices include optical sensing components such as a sensor set consisting of an LED and a photodiode. These devices are typically expensive because they include high cost components. In particular, the light output of an LED is determined by the LED's conversion efficiency, the current through the LED, and temperature. To minimize variations in operation among each product, manufacturers typically select higher cost LEDs which provide more uniform light emissions. Manufacturers find it difficult to maintain product quality by replacing the high cost components with lower cost components due to poor tolerances in the lower cost components. For instance, low cost LEDs vary in their efficiency for a given current and temperature by over ±20%. Furthermore, if the voltage across a P-I-N photodiode is held constant (i.e., at either 0v or reverse voltage), the current generated will be very proportional to the amount of light falling on the photodiode and will vary slightly with temperature. As a result, low cost photodiodes vary in their efficiency for a given light exposure and temperature by over ±10%. Accordingly, if a "loss factor" is defined as the ratio of the current generated by the photodiode to the current driving the LED when no portion of the LED is masked, the "loss factor" for the different sensor sets can vary by as much as ±30%.

Additionally, LEDs typically require relatively large amounts of power to emit light effectively onto their corresponding photodiodes. Since power is a limited resource in these devices, the operation of the LEDs imposes powers limitations to other circuit components of the devices. This limitation is particularly significant when operating several LEDs at the same time for an extended period of time.

Furthermore, the circuitry that operates the optical devices is often includes a microcontroller, a clock circuit, a digital-to-analog converter (DAC), an analog-to-digital converter (ADC), and a multiplexing circuit. The number and costs of these components increases the size and price, respectively, of the optical devices. Some chip manufacturers offer microcontrollers that provide analog-to-digital conversion circuitry but at an added cost. Additionally, microcontrollers typically use a crystal or ceramic resonator to provide a clock signal. Crystals provide high accuracy but at a high cost. Ceramic resonators provide lower accuracy at a lower cost. RC networks can be provided at an even lower cost but typically are inaccurate due to variations in component tolerances. Accordingly, some microcontrollers provide an on-chip RC-based oscillator for functions that are less frequency dependent. However, these devices vary by as much as ±40% from device to device.

SUMMARY OF THE INVENTION

The shortcomings of the prior art are overcome and other objects are accomplished with a force and torque converter, which is substantially stationary with respect to a mounting surface which may be part of a computer with which the converter is used. Alternatively, the mounting surface may be independent of the computer.

In one embodiment of the invention, the apparatus transforms applied forces and torques into translational components along three mutually orthogonal axes and torque components about these axes. This embodiment includes a body, which receives the applied force and torque. Three connection members are attached to the body and extend away therefrom. Remote connection points on the respective connection members lie along respective, mutually orthogonal reference axes, which extend from a central point of the body. Legs are pivotally connected to the respective connection members at respective connection points through universal joints of limited range and motion. Biasing mechanisms bias the connecting members toward a central position. Sensor mechanisms sense displacement of each connecting member and each connecting leg thereby determining the nature of the applied forces. Rotation of the body about an axis is sensed by sensors mounted by connection members having reference axes orthogonal to the axis about which rotation takes place.

Another embodiment of the invention is directed to an apparatus for providing an electronic signal in response to at least one of an applied force and an applied torque. The apparatus includes a base; a movable member that provides movement relative to the base in response to the at least one of the applied force and the applied torque; a controlling mechanism having a plurality of resilient mechanisms, connected to the base and co-acting with the movable member, that provide at least one of a restoring force and a restoring torque to the movable member in response to the at least one of the applied force and the applied torque, and a restraining member, disposed within the movable member, that restrains the movable member when the movable member is in contact with the restraining member; and a detection circuit, coacting with the controlling mechanism, that detects the movement of the movable member relative to the base, and provides the electronic signal.

In another embodiment, the base is disposed within a central area of the restraining member.

In another embodiment, at least a portion of the detection circuit is disposed around the base and within the restraining member.

In another embodiment, at least a portion of the restraining member supports the base and resists movement of the base relative to the restraining member.

In another embodiment, each of the restraining member and the movable member has a surface of similar shape.

In another embodiment, the surface of similar shape of the restraining member is an outer surface, and the surface of similar shape of the movable member is an inner surface, each surface of similar shape being spherical.

In another embodiment, at least a portion of the detection circuit includes a plurality of rigid members, each rigid member supporting at least one sensor component; and a plurality of flexible members, the plurality of rigid members and the plurality of flexible members being disposed around the base so that the at least one sensor component of each rigid member is aligned in a predetermined orientation relative to one of the plurality of resilient mechanisms.

In another embodiment, the detection circuit includes a plurality of sensor sets, each sensor set being disposed within the restraining member in a predetermined orientation relative to a corresponding one of the plurality of resilient mechanisms, and signal processing circuitry coupled to the plurality of sensor sets, that provides a predetermined calibrated signal for each sensor set so that each sensor set produces a similar response for a similar displacement of the corresponding one of the plurality of resilient mechanisms.

In another embodiment, the restraining member includes at least two portions, each portion having at least one opening through which one of the plurality of resilient mechanisms extends.

In another embodiment, the movable member includes at least two portions, each portion having at least one recess that receives an end of one of the plurality of resilient mechanisms.

Another embodiment is directed to an apparatus for providing an electronic signal in response to at least one of an applied force and an applied torque. The apparatus includes a base; a movable member that provides movement relative to the base in response to the at least one of the applied force and the applied torque; controlling means for controlling movement of the movable member relative to the base, the controlling means including means for providing at least one of a restoring force and a restoring torque to the movable member in response to the at least one of the applied force and the applied torque, and means for restraining the movable member when the movable member is in contact with the means for restraining; and a detection circuit, co-acting with the controlling means, that detects the movement of the movable member relative to the base, and provides the electronic signal.

In another embodiment, the base is disposed within a central area of the restraining means.

In another embodiment, at least a portion of the detection circuit is disposed around the base and within the restraining means.

In another embodiment, the restraining means includes means for supporting the base and resisting movement of the base relative to the restraining member.

In another embodiment, the movable member has a surface having a predetermined shape, and the restraining means includes a restraining member having a surface that has a shape similar to the predetermined shape.

In another embodiment, the surface of the restraining member is an outer surface, wherein the surface of the movable member is an inner surface, and wherein both the predetermined shape and the shape similar to the predetermined shape are spherical shapes.

In another embodiment, at least a portion of the detection circuit includes a plurality of rigid members, each rigid member supporting at least one sensor component; and a plurality of flexible members, the plurality of rigid members and the plurality of flexible members being disposed around the base so that the at least one sensor component of each rigid member is aligned in a predetermined orientation.

In another embodiment, the detection circuit includes signal processing circuitry coupled to a plurality of sensor sets co-acting with the controlling means, that provides a predetermined calibrated signal for each sensor set so that each sensor set produces a similar response for a similar sensed detection.

In another embodiment, the resilient means includes a plurality of resilient mechanisms connected to the base, and wherein the restraining means includes means for enabling the plurality of resilient mechanisms to co-act with the movable member.

In another embodiment, each of the resilient mechanisms includes means for engaging the resilient mechanism with the movable member, and minimizing friction between the resilient mechanism and the movable member.

In one embodiment of the invention, a small displacement results from the application of the translational force and torque. However, alternative embodiments may be constructed in which no displacement occurs. For example, an alternative embodiment may include automatic control to input energy to resist displacement. The input of energy would have a corresponding indicative signal of the applied force, which could then be used by a computer or control system.

In another embodiment, signal processing mechanisms are included for processing the signals generated by the respective sensors into output signals that are representative of the applied torque and translational force.

Another embodiment of the invention is directed to a device for providing a detection signal in response to a drive signal for driving a plurality of first sensor components. The device includes a control circuit having a first output that provides a digital control signal, and a first input for receiving a comparison signal, and a second output that provides the detection signal according to the comparison signal; a digital-to-analog converter having an input coupled to the first output of the control circuit, and an output that provides the drive signal in response to the digital control signal; and a measuring circuit having a first input coupled to the output of the digital-to-analog converter, a second input that receives a result signal from a plurality of second sensor components co-acting with the plurality of first sensor components, and an output coupled to the first input of the control circuit that provides the comparison signal.

In another embodiment, the measuring circuit includes a sample-and-hold circuit having an input coupled to the second input of the measuring circuit that receives the result signal, and an output that provides a temporarily stored signal indicative of the result signal; and a comparator having a first input coupled to the first input of the measuring circuit, a second input coupled to the output of the sample-and-hold circuit that receives the temporarily stored signal, and an output coupled to the output of the measuring circuit.

In another embodiment, the control circuit further includes a third output, and the measuring circuit further includes a multiplexor interconnected between the second input of the measuring circuit and the input of the sample-and-hold circuit, the multiplexor having a first input coupled to the third output of the control circuit, a second input coupled to the second input of the measuring circuit, and an output coupled to the input of the sample-and-hold circuit.

In another embodiment, the control circuit further includes a fourth output, and the device further includes a drive selection circuit having a first input coupled to the fourth output of the control circuit, a second input coupled to the output of the digital-to-analog converter, and an output that selects one of the plurality of first sensor components and applies the drive signal to the selected one of the plurality of first sensor components.

In another embodiment, the control circuit further includes a second input, and the device further includes a memory coupled to the second input of the control circuit, for storing a plurality of calibration values, each calibration value defining a value of the control signal for each of the plurality of first sensor components.

In another embodiment, the control circuit, the digital-to-analog converter, and the measuring circuit are integrated within a semiconductor component.

In another embodiment, the device further includes an interface circuit coupled to the second output of the control circuit, for providing the detection signal to an external device.

Another embodiment of the invention is directed to a device for providing a detection signal in response to a drive signal for driving a plurality of first sensor components. The device includes a control circuit having a first output that provides a digital control signal, and a first input for receiving a comparison signal, and a second output that provides the detection signal according to the comparison signal; a digital-to-analog converter having an input coupled to the first output of the control circuit, and an output that provides the drive signal in response to the digital control signal; and means, coupled to the first input of the control circuit, for providing the comparison signal according to a comparison of the analog signal of the digital-to-analog converter and a result signal from a plurality of second sensor components co-acting with the plurality of first sensor components.

In another embodiment, the control circuit further includes a third output, and the means for providing includes means, coupled to the third output of the control circuit, for isolating at least one of the plurality of second sensor components to reduce a settling time of the result signal.

In another embodiment, the control circuit further includes a second input, and the device further includes a memory coupled to the second input of the control circuit, for storing a plurality of calibration values, each calibration value defining a value of the control signal for each of the plurality of first sensor components.

Another embodiment of the invention is directed to an apparatus for providing an electronic signal in response to at least one of an applied force and an applied torque. The apparatus includes a base; a movable member that provides movement relative to the base in response to the at least one of an applied force and an applied torque; a controlling mechanism connected to the base and co-acting with the movable member to control the movement of the movable member relative to the base; and a detection device that detects the movement of the movable member relative to the base, and provides the electronic signal, by driving a plurality of first sensor components, the detection device including: (a) a control circuit having a first output that provides a digital control signal, and a first input for receiving a comparison signal, and a second output that provides the detection signal according to the comparison signal, (b) a digital-to-analog converter having an input coupled to the first output of the control circuit, and an output that provides the drive signal in response to the digital control signal; and (c) a measuring circuit having a first input coupled to the output of the digital-to-analog converter, a second input that receives a result signal from a plurality of second sensor components co-acting with the plurality of first sensor components, and an output coupled to the first input of the control circuit that provides the comparison signal, the plurality of first sensor components and the plurality of second sensor components co-acting with the controlling mechanism.

In another embodiment, the controlling mechanism includes a plurality of resilient mechanisms, and wherein at least a portion of the detection circuit includes a plurality of rigid members, each rigid member supporting at least one of the plurality of first sensor components and the plurality of second sensor components; and a plurality of flexible members, the plurality of rigid members and the plurality of flexible members being disposed around the base so that the at least one sensor component of each rigid member is aligned in a predetermined orientation relative to one of the plurality of resilient mechanisms of the controlling mechanism.

Another embodiment is directed to a method for constructing a force and torque converter. The method includes the steps of: (A) folding a printed circuit board subassembly around a base having at least one resilient mechanism connected to the base and extending therefrom; and (B) fitting together at least two portions of a movable member around the printed circuit board assembly and engaging an end of the at least one resilient mechanism with the at least two portions of the movable member.

In another embodiment, the method further includes the step of, before step B, fitting together at least two portions of an intermediate member around the printed circuit board assembly and passing an end of the at least one resilient mechanism through an opening in the at least two portions of the intermediate member.

In another embodiment, the method further includes the step of, before step A, fitting together a first hemicube and a second hemicube to form the base.

Another embodiment of the invention is directed to a method of constructing a printed circuit board assembly comprising the steps of: (A) forming a series of grooves in first PCB material to produce a bending region thereon; (B) bonding second PCB material to the first PCB material to produce a intermediate assembly, the second PCB material having at least one electrically conductive layer; and (C) bending the intermediate assembly into the printed circuit board assembly.

In another embodiment, the method further includes the step of processing the intermediate assembly by etching tracks into the electrically conductive layer, and routing holes into the intermediate assembly.

In another embodiment, the method further includes the step of wavesoldering components onto the processed intermediate assembly.

In another embodiment, the method further includes the step of installing a holder to accurately locate at least one of the components.

Another embodiment of the invention is directed to a printed circuit board assembly constructed in accordance with the above described process.

Another embodiment of the invention is directed to a force and torque converter having a detection circuit constructed in accordance with the above described process.

With regard to the micro-computer field, a lower cost embodiment of the above-described invention may be preferred in some cases. To date, mouse-type or joystick-type general computer applications have utilized only planar sensing (i.e., two degrees of freedom, one for each orthogonal axis of the plane). According to some embodiments of the invention, sensing one rotational component is possible, as well. These embodiments provide a third degree of freedom for programming. It is recognized, though, that more sophisticated applications may need and therefore desire the above-described embodiments, which provide up to six degrees of programming freedom (three degrees of freedom from sensing the three orthogonal directional components of the applied force and three more degrees of freedom from sensing the three rotational components possible from applied torques).

Much like the above-described embodiments, the lower cost embodiments sense the force and torque applied to the body. The construction is simpler since only force in one plane and at most one orthogonal torque needs to be detected. This embodiment retains the essential features of providing an electronic representation of the applied torque and force, and substantially restoring the body to a starting position upon releasing the apparatus.

It is believed that users generally prefer to apply different strength forces to a device depending upon the response they desire. Small forces and torques are generally applied when a precise response is desired. For example, the user might slightly tap the mouse to move a pointer one pixel. Stronger forces and torques are generally applied when a faster response is desired. For example, the user might push the device more forcefully to rapidly move a graphical object across the computer screen.

Different embodiments of the present invention implement a desirable sensitivity curve through appropriate design of the resilient means, the sensing mechanisms, the signal processing mechanisms, or through combinations of the above. The sensitivity curve is such that the device provides a precise response for relatively small applied forces and a fast response for relatively large applied forces. In one embodiment, a sensitivity curve relates applied torques to the output. In another embodiment, the sensitivity curve includes a null region, in which the device essentially ignores applied forces and torques falling within the range of forces and torques corresponding to the null region. Thus, slight jiggles by the user, and similar "noise", are ignored.

BRIEF DESCRIPTION OF THE DRAWING

The invention will become more apparent from the following detailed specification and drawing in which.

DETAILED DESCRIPTION OF THE INVENTION

The Patent entitled TORQUE AND FORCE CONVERTER, U.S. Pat. No. 4,811,608 to Hilton is hereby incorporated by reference to avoid duplicating the disclosure of for the numerous embodiments and their description.

Figure 1:
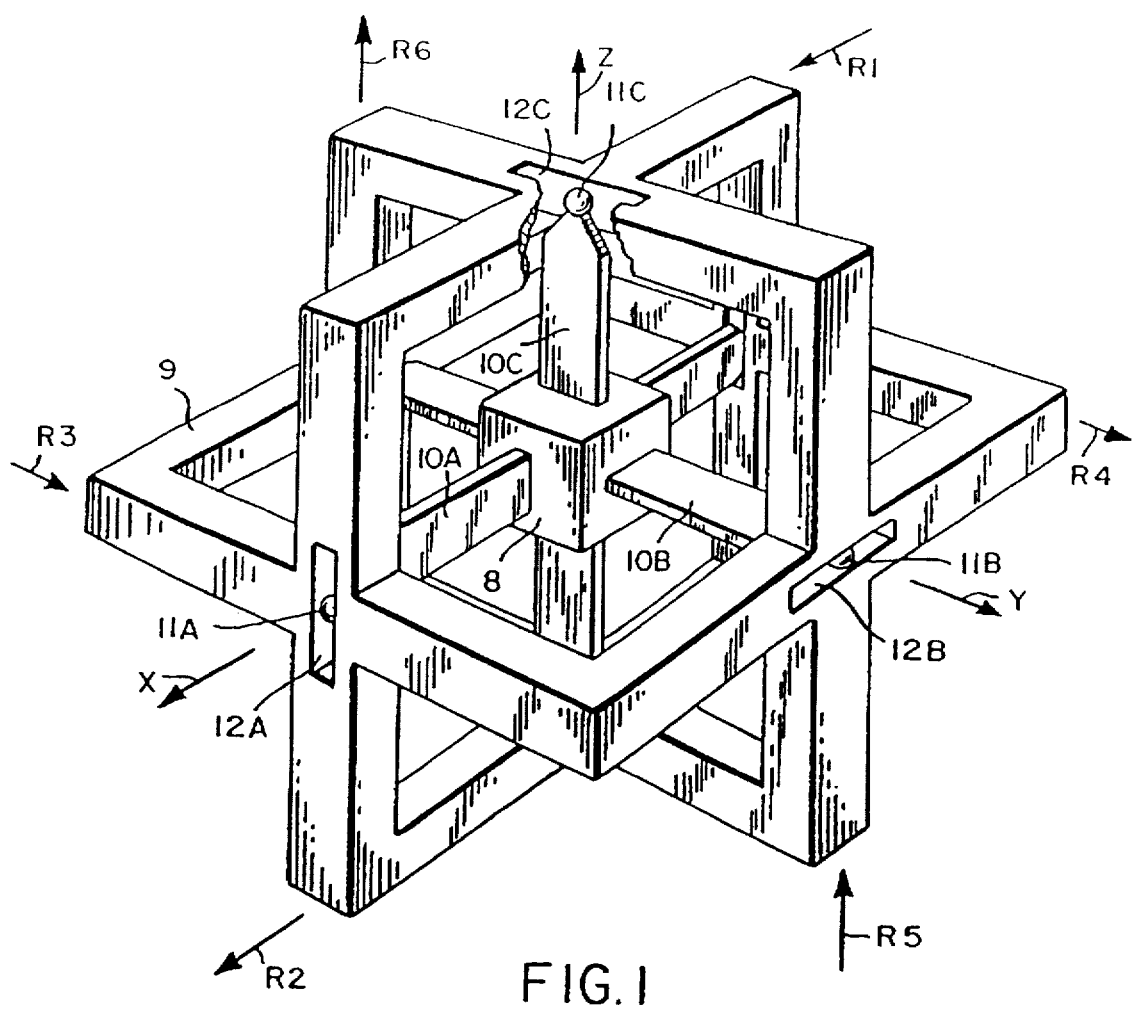
FIG. 1 is a schematic view of a first embodiment of the invention.

In a first embodiment of the invention, referring to FIG. 1, three pairs of leaf-spring elements 10A, 10B, and 10C are attached to a metal base 8 and extend in three mutually perpendicular planes. The center lines of the leaf-spring elements intersect at the center of the base 8, and extend respectively along X, Y, and Z axes. The leaf-spring elements 10A, 10B, and 10C are substantially of the same length and each leaf-spring element has at the end furthest from the base 8, a ball-like tip 11A, 11B, and 11C which lies within a respective slot 12A, 12B, and 12C in hand grip 9 (represented by a frame for clarity sake). Each slot 12A, 12B, and 12C provides constraint of the corresponding tip 11A, 11B, and 11C against movement relative to the grip 9 in a direction perpendicular to the plane of the corresponding leaf spring.

Thus, for example, a force applied to the grip 9 along the Z axis causes bending of the leaf-springs 10B only. Strain gauges or similar sensing means (not shown) measure the bending or displacement, so that a signal representative of the applied force can be produced. Each tip 11A, 11B, and 11C has a freedom of motion relative to the grip 9 in the plane of the corresponding leaf-spring. Thus, displacement of the hand grip 9 along the direction of elongation of a leaf-spring, or across the direction of the leaf-spring does not result in any bending of the leaf-spring.

A displacement force at an angle is resolved into corresponding couples about the respective X, Y, and Z axes. For example, torque about the Z axis causes equal and opposite bending of the leaf-springs 10A as the respective tips are deflected.

Similarly, a torque applied to the hand grip is resolved into corresponding couples about the respective X, Y, and Z axes. For example, torque about the Z axis causes equal and opposite bending of the leaf-springs 10A as the respective tips are deflected.

By way of illustration, when a force is applied to the hand grip 9 in the X direction, there is a corresponding slight bending of one pair of leaf-spring elements 10C such that one element of the pair bends a distance equal to R1 and the other element bends a distance equal to R2. The resultant force in the X direction is thus given by $$F_x = R1 + R2 \quad (1).$$

Similarly, if a torque is applied about the Y axis, one of the leaf-springs of a leaf-spring pair 10C bends and produces a displacement of R1, while the other leaf-spring of the same pair bends and produces a displacement of R2 in the opposite direction. The resultant displacement about the Y axis is thus given by $$T_y = R1 - R2 \quad (2).$$

The remaining forces and torques are calculated in a similar manner.

Figure 2:
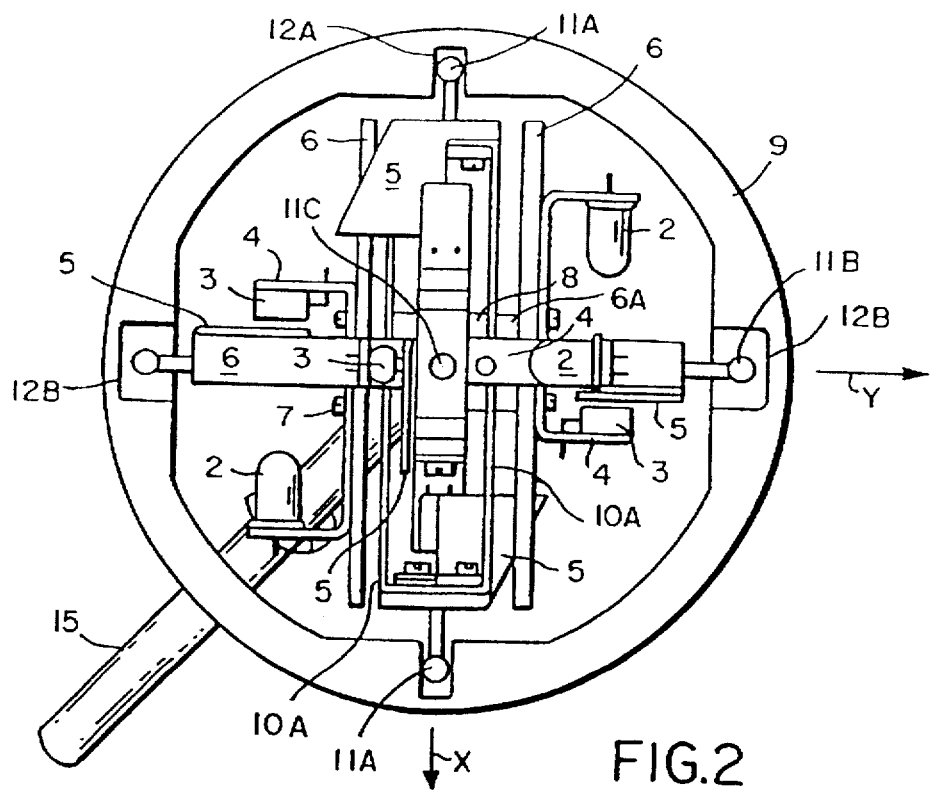
FIG. 2 is a plan view of the first embodiment in practical form with the top of the spherical hand grip removed.
Figure 3:
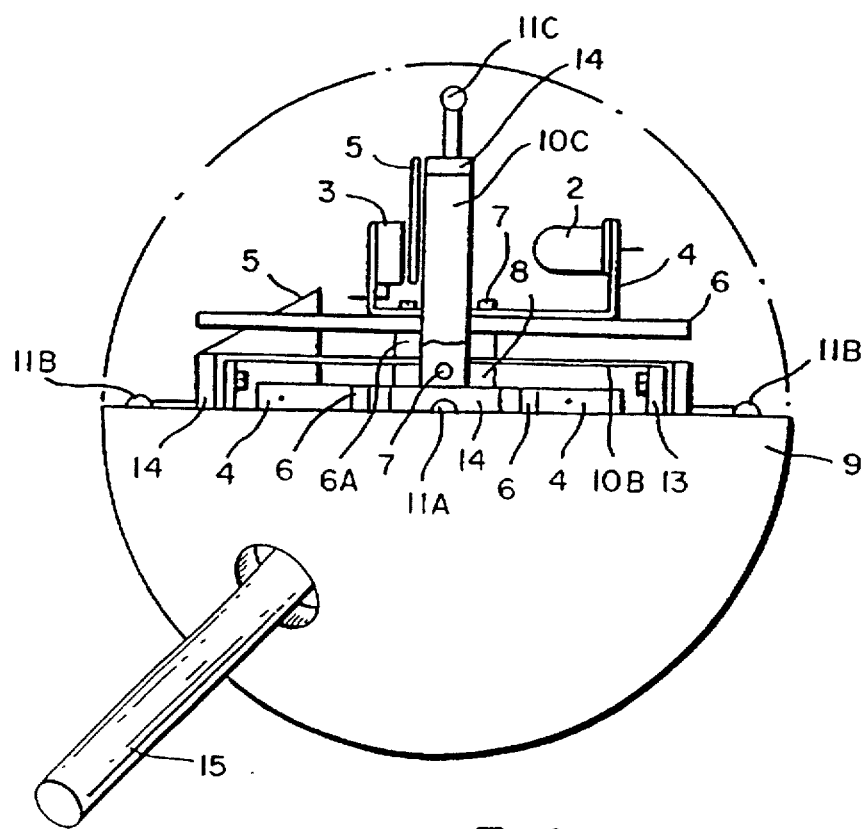
FIG. 3 is a partially broken away side-view of the first embodiment with the top of the hand grip removed and the front portion of the arm structure in the middle region just above the central plane omitted.

In practice an apparatus as shown in FIGS. 2 and 3 is used to implement the principles shown by the schematic diagram of FIG. 1. Like parts have been given like reference numerals. The sensing apparatus is supported by a fixed supporting rod 3 above a ground plane. The rod 3 connects to a central mounting block 8. A force or torque applied by an operator's hand placed on a spherical hand grip 9 is converted into mutually perpendicular components by means of an optical detector. Each of the X, Y, and Z leaf-spring elements consists of a pair of flat resilient metal strips spaced apart and secured by screws 7 to opposite faces of the central mounting block 8. At their remote ends, the strips are interconnected by a connector 13 having screws which also attaches an end fitting 14. The end fitting 14 has an axially extending shaft terminating in the ball like tip 11A, 11B, or 11C.

A second embodiment of the invention employs many of the concepts and features of the first embodiment. Like the first embodiment, the second embodiment is directed to an apparatus for providing an electronic signal in response to a physical motion. The apparatus includes a base 201,203 (see FIG. 14); a movable member 229 that moves relative to the base in response to the physical motion (see FIG. 16); a controlling member 205,207,215 (see FIGS. 14 and 15), co-acting with both the base 201,203 and the movable member 229, that controls movement of the movable member 229 relative to base 201,203; and a detection circuit 239 (see FIG. 17), co-acting with the controlling member 205, 207,215, that detects the movement of the movable member 229 relative to the base 201, and provides the electronic signal.

Figure 14:
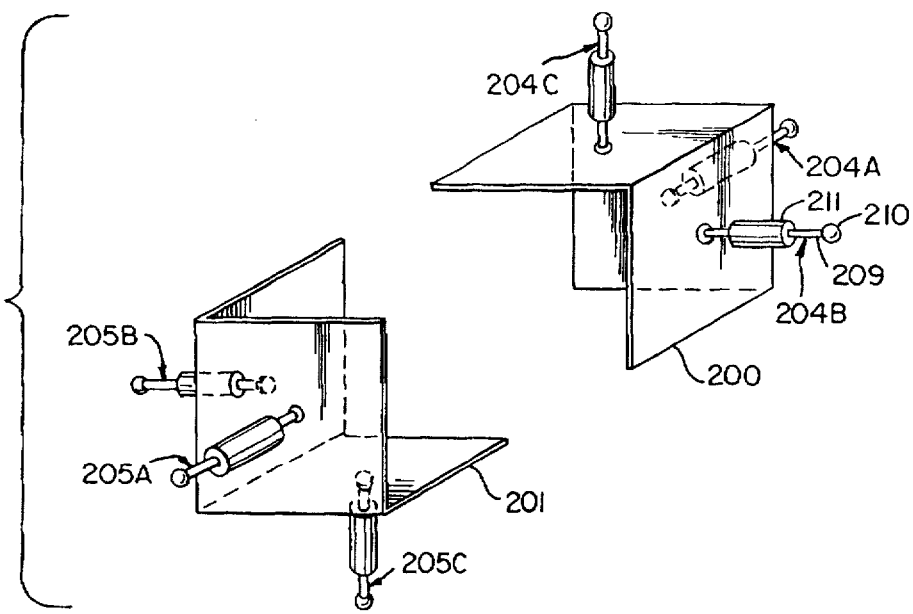
FIG. 14 is a perspective view of a base and resilient mechanisms of one embodiment of the invention.

As shown in FIG. 14, the base includes two portions 201 and 203. Each portion is in the shape of half a cube, i.e., a "hemicube", which when combined with its counterpart hemicube, forms a full cube. The cubular shape is not a requirement, and the base may be formed in other shapes such as a ball, rectangular solid or any other three-dimensional structure. However, the cubed shaped is preferred since it easily lends itself to providing six sides, wherein a pair of sides corresponds to each of the X, Y and Z axes.

The base 201,203 is considered a fixed point of reference relative to the movable member 229. The base 201,203 may be directly mounted to a rod 3 as in the first embodiment (see FIGS. 2 and 3). However, as will be discussed later, the base 201,203 is preferably supported by intervening structure which mountable to the rod 3 or any other supporting structure.

Each hemicube has at least one resilient mechanism extending from the surface of the hemicube in an outward direction. The particular embodiment shown in FIG. 14, shows three resilient mechanisms 205,207 on each hemicube 201,203, respectively. Each resilient mechanism includes an elongated spring-type structure 209 which co-acts with the hemicube by providing a first end which is stationary relative to the hemicube, and a second end which is movable. For example, the leaf-spring elements 10A, 10B and 10C of the first embodiment may be used, wherein half of a leaf-spring element forms one of the elongated spring-type structures 209. Alternatively, each elongated spring-type structure 209 is a separate part and inserted or fastened into the hemicube.

Each resilient mechanism further includes a masking portion 211. Each masking portion is formed from part of the elongated spring-type structure itself, or is added as a separate by sliding the elongated spring-type structure 209 through the masking portion 211.

The second end of each resilient mechanism includes means for co-acting with the movable member 229. The second end of each resilient mechanism is intended to engage the movable member. The second ends may be firmly connected, or attached to the movable member to increase the rigidity of the movable member, i.e., to increase the forces and torques required to displace the movable member. However, preferably, the second end merely slides into the movable member to provide minimized friction at the points where the second end engages the movable member. Therefore, the second end is not rigidly fastened to the movable member and could be easily removed at some time in the future by simply withdrawing the second end from the movable member. Preferably, each resilient mechanism includes a ball structure at the second end that engages the movable member to provide the above-described benefits.

The base 201,203 is preferably supported by an intervening member which performs additional control functions. The intervening member contains the base so that the base does not move relative to the intervening member. To this end, internal portions such as tabs or base-shaped details of the intervening member contact and hold the base in place.

Figure 15:
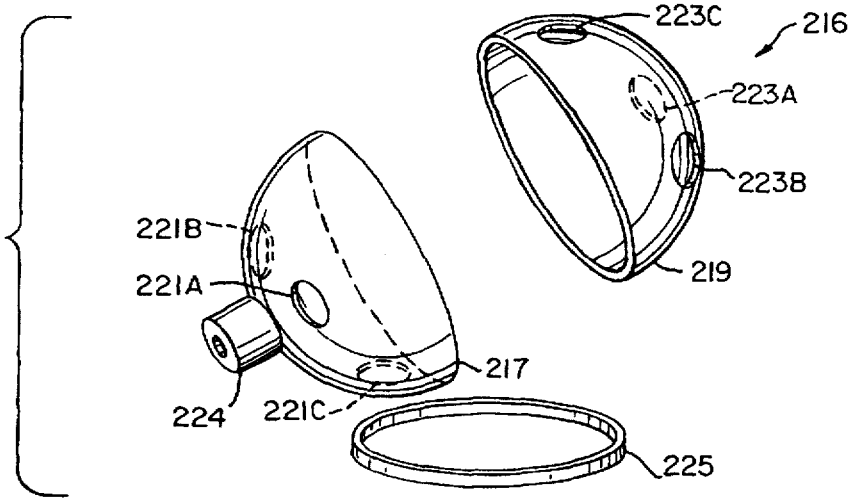
FIG. 15 is a perspective view of an inner ball structure of one embodiment of the invention.

FIG. 15 shows a preferred embodiment of the intervening member which is an inner ball structure 215. Although the inner ball structure may be in the form of other shapes such as a cubular or hexagonal solids, preferably, the inner ball structure is spherical in shape for reason which will be shortly discussed. The inner ball structure is hollow and formed using a first half 217 and a second half 219. Each half includes at least one opening to accommodate a resilient mechanism that extends from the base. Each inner ball half shown in FIG. 15 includes three openings so that the inner ball provides a total of six openings to accommodate the six resilient mechanisms shown in FIG. 14. It is not necessary that all three resilient mechanisms of a hemicube use all three openings from an inner ball half. Rather, an inner ball half may accommodate one resilient mechanism from one hemicube and two resilient mechanisms from another hemicube.

The inner ball halves 217,219 enclose the base 201,203 so that each resilient mechanism extends through one of the openings of the inner ball 217,219. Internally, the inner ball supports the base so that the base 201,203 is stationary relative to the inner ball 217,219. A portion 224 of one of the inner ball halves 217 may be constructed and arranged to co-act with another structure such as the rod 3 in the first embodiment. In this way, the base 201,203 may be held stationary relative to the rod 3 using the inner ball 217,219 as an intervening supporting member. The portion 224 is further arranged to permit a cable of the detection circuit to pass from the inner ball 215. Alternatively, the rod 3 is hollow and receives the cable so that no further modification of the portion 224 is necessary. The halves of the inner ball 217,219 are held together by any means such as glue, interleaving ridges, or preferably a spring circlip 225 which encircles the inner ball 217,219 and is held in place by an equatorial valley formed in the inner ball 217,219.

The movable member 229 co-acts with the resilient mechanisms so that the movable member 229 moves relative to the base in response to either a force or torque applied to the movable member 229. The resilient mechanisms in combination with the inner ball enable the movable member to physically move relative to the base in a controlled manner. In particular, the amount of force or torque required to displace the movable member is a function of the characteristics of the resilient mechanisms, as well as the shape and size of the inner ball relative to the shape of the movable member. For instance, as the elongated spring-type structures become more rigid or stiff, they will permit less physical motion of the movable member 229 in response to a particular force or torque applied to the movable member 229. Hence, equations (1) and (2), as described in the first embodiment, also characterize the behavior of the second embodiment for a particular range of motion.

It is possible to select the characteristics of the resilient mechanisms so that the movable member is allowed to contact the inner ball. In this situation, movement of the movable member is controlled further by the shaped of the outer surface of the inner ball. Motion of the movable member is limited when the movable member is resisted by the inner ball. Accordingly, the inner ball can be said to control the motion of the inner ball because its shape dictates the ultimate range of movement of the movable member.

Figure 16:
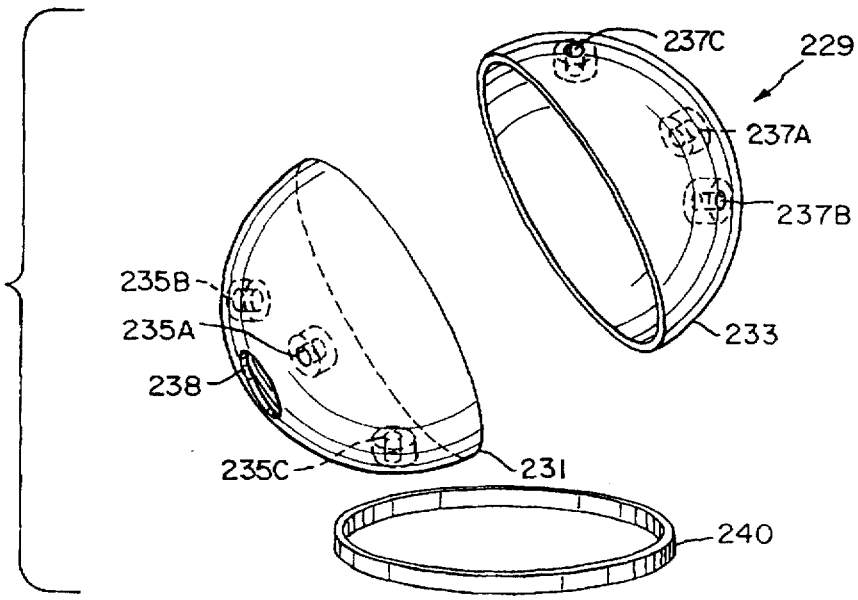
FIG. 16 is a perspective view of an outer ball structure of one embodiment of the invention.

FIG. 16 shows an exemplary movable member 229 in the form of an outer ball. Although the movable member 229 is in the shape of a sphere, other shapes such as a square or hexagon are anticipated. Nevertheless, the sphere shape is preferable since the intervening member, that separates the base and the movable member, is an inner ball 217,219.

The outer ball has a first half 231 and a second half 233. The movable member 229 is constructed and arranged to surround the inner ball 215 (see FIG. 15), and co-act with the resilient mechanisms. In particular, portions of the movable member are designed to engage the second ends of the resilient mechanisms 205,207. For instance, the ball portions 213 are received by the recesses 235,237 of the movable member 229 so that the second ends are held stationary relative to the movable member 229 and friction between the resilient mechanisms and the movable member 229 is minimized.

The first half 231 of the outer ball includes a hole 238 for the rod 3 to support the base 201,203. The hole 238 may be shaped so that it further controls the range of motion of the movable member relative to the base. This may be achieved by shaping the edges of the hole 238 so that the movable member is resisted by the edge of the hole 238 when it is intended that the movable member be stopped. Similar to the portion 224 of the inner ball 215, the hole 238 is arranged to permit a cable to pass through the hole or alternatively, the cable passes through a hollow portion of the rod 3.

The halves of the outer ball 231,233 are held together by any means such as glue, interleaving ridges, a circlip, or preferably a plastic ring 237 which slips around the outer ball 231,233 and is held in place by an equatorial valley formed in the outer ball 231,233. The plastic ring 237 provides a more aesthetic appearance than a circlip.

Since the resilient mechanisms 205,207 and intervening member (e.g., the inner ball 217,219) control the physical motion of the movable member 229 as described above, this combination of structures forms a controlling member. This controlling member co-acts with both the base 201,203 and the movable member 229 to control movement of the movable member 229 relative to the base.

The detection circuit 239 of the second embodiment co-acts with the controlling member to detect movement of the movable member 229. As will be described later, the detection circuit 239 may include the sensing apparatus of the first embodiment (see FIGS. 2 and 3) or an alternative apparatus.

Many applications do not require as many degrees of freedom as the above-described embodiments provide (i.e., six). Consequently, a lower cost embodiment can be achieved by providing fewer degrees of freedom. For instance, there can be an embodiment, wherein only planar forces are sensed, thus providing two degrees of freedom (hereinafter this embodiment is referred to as the "two-axis embodiment"). This embodiment only senses planar forces and decomposes them into X and Y components. In another embodiment, a planar force and a rotational torque applied about an axis that is orthogonal to the plane is sensed, thus providing three degrees of freedom (hereinafter this embodiment is referred to as the "three-axis embodiment").

Figure 4:
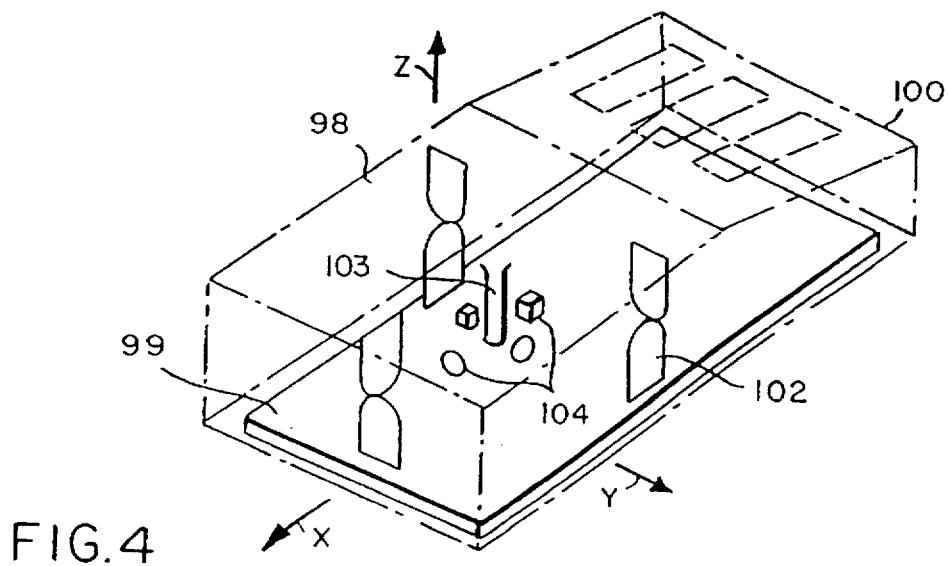
FIG. 4 is a perspective view of an embodiment of the invention that senses planarly applied force.

In a third embodiment, referring to FIG. 4, the grip 100 and base 99 are connected by three flat resilient metal flexure elements 102. The metal flexures 102 are mounted with their axes parallel to the Z axis and have a 90° twist about each of their midpoints. A masking post 103 extends from the grip 100 parallel to the Z axis. Sensor sets 104 are positioned to detect movement of masking post 103 (FIG. 4 illustrates one sensor arrangement, other sensor arrangements are discussed below). Lines 98 transmit an analog signal to an external processing mechanism (discussed below).

In connection with the above discussed embodiments, numerous forms of resilient mechanisms, employing various materials in various physical structures, are possible. The resilient mechanisms employed in the above-described embodiments exhibit a set of characteristics important to the operation of the device. These characteristics are isolation of planar effort from non-planar effort, negligible material hysteresis, negligible friction, and high reliability.

The physical hysteresis of the device is determined by the range of physical displacements the device returns to when released. For example, pushing the movable member (e.g. the grip 100) to the limit in one direction and releasing will result in a specific position. Pushing to the limit in another direction and releasing will result in a slightly different position. The difference between these two positions defines the physical hysteresis along the tested direction. The embodiments described above exhibit negligible physical hysteresis due to the use of metal flexure elements. In particular, spring steels have extremely low hysteresis properties. Friction in any form introduces hysteresis into the design, since friction dissipates energy. The flexure arrangement described earlier is designed to avoid friction.

The detection circuit for the above-described embodiments will now be discussed in more detail. FIGS. 2 and 3 show a sensing apparatus including an optical detector associated with each leaf-spring which preferably includes a light emitting diode (LED) 2 and a photodiode 3 fixedly mounted on a bracket 4. Each bracket 4 is mounted on a respective mounting bar 6 secured by screws 7 to the central block 8. A packing block 6A and the central part of the leaf-spring element are sandwiched between the mounting bar 6 and the central block 8. A shutter 5 is attached to the end fitting 14. Thus, movement of the shutter 5 alters the amount of radiation from LED 2 that can be detected by photodiode 3. Thus, the current in the electrical circuitry is representative of the displacement and, consequently, the force.

Figure 5:
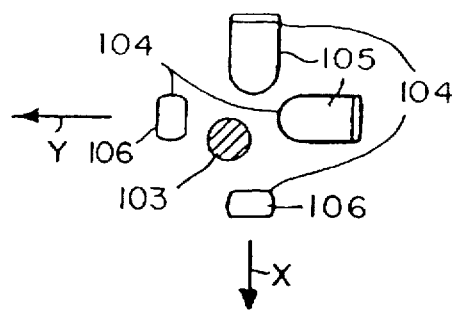
FIG. 5 is a plan view of the sensing mechanism of one embodiment of the invention that sense planarly applied force by photo-optical detection.
Figure 6:
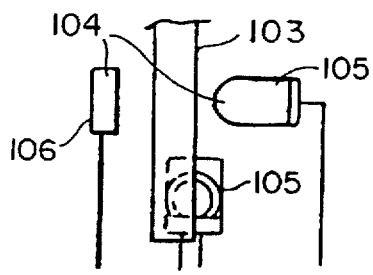
FIG. 6 is a side view of the sensing mechanism of one embodiment of the invention that sense planarly applied force by photo-optical detection.

FIG. 5 is a plan view and FIG. 6 is a side-view of the sensor mechanism of the two-axis embodiment. Sensor sets 104 are located about the masking post 103: one sensor set detects displacement along the X axis; the other sensor set detects displacement along the Y axis. Since the displacement is in direct relation to the applied force and torque, as a result of the resilient mechanisms, the output of the sensors is representative of the applied force and torque.

Referring to FIG. 5 the sensor set 104 comprises an infrared light emitting diode (LED) 105, an infrared photodiode 106 and mask 103. As the mask is translationally displaced, the amount of light received by the photodiode 106 corresponds to the displacement of the mask 103 perpendicular to the direction of the light beam. Displacement of the mask parallel to the light beam or rotation of the rod about its axis has negligible effect on the amount of light received by the photodiode 106.

As the grip 100 is displaced, the sensors 104 detect translational displacement along the X and Y axes. Translational displacement along the Z axis and rotational displacement about any axis in the X-Y plane are mostly resisted by the resilient flexure elements 102. Likewise, other inhibiting means, (not shown), may be employed to resist these and other movements to protect the resilient means from unwanted, over-extension. In the two-axis embodiment, rotational displacement about the Z axis is mostly ignored by the sensors, though the resilient means can allow such displacement.

The orthogonal arrangement shown in FIG. 5 significantly facilitates later processing of the analog signals provided by the sensors. However, the two sensor sets, in fact, need not be orthogonal. For example, if the grip utilizes a design which does not allow such orthogonal arrangement, the sensor sets could be non-orthogonally arranged. All that is required is that the sets be angularly displaced about the center point. Displacement of the masking post could then be decomposed into its orthogonal components during the signal processing phase.

Figure 7:
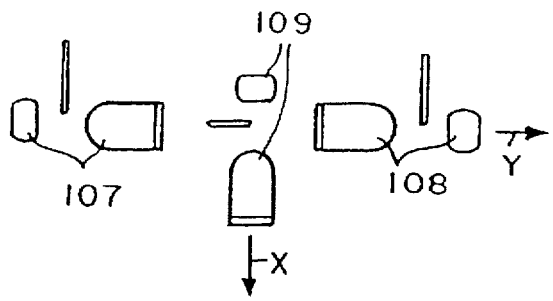
FIG. 7 is a plan view of the sensing mechanism of an embodiment of the invention that senses by photo-optical detection planarly applied force and torque applied about an axis that is orthogonal to the sensed plane.
Figure 8:
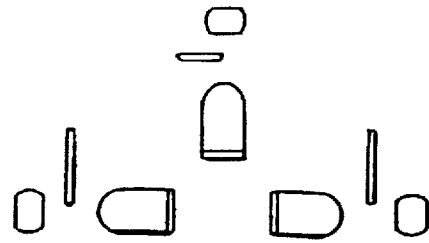
FIG. 8 is a plan view of the sensing mechanism of an alternative embodiment of the invention that senses by photo-optical detection planarly applied force and torque applied about an axis that is orthogonal to the sensed plane.

FIG. 7 is a plan view of the sensor arrangement for a three-axis embodiment. This embodiment can utilize the other elements from the two-axis embodiment, e.g., resilient mechanism. This sensor arrangement detects rotation about the Z axis (the Z axis being perpendicular to the plane of the page). Sensor set 109 detects the translational component along the Y axis. Either of sensor sets 107 and 108 can detect the translational component along the X axis. The combination of sensor sets 107 and 108 detect the rotational component about the Z axis. When the grip is rotated about the Z axis, sensor set 107 will detect a displacement opposite in a direction to the displacement detected by sensor set 108. The sensor sets may be arranged differently, e.g., as shown in FIG. 8, or non-orthogonally as discussed for the two-axis embodiment.

It will be apparent to those skilled in the art that various arrangements may be utilized and that the sensor sets 104 may be substituted with sensors that employ capacitive, inductive, electromagnetic, resistive, piezo-electric or optical sensing. Further, the sensor mechanism may sense the applied force and torque by sensing the resilient mechanisms themselves (e.g., by strain gauges), rather than by sensing components such as masking posts.

Figure 17:
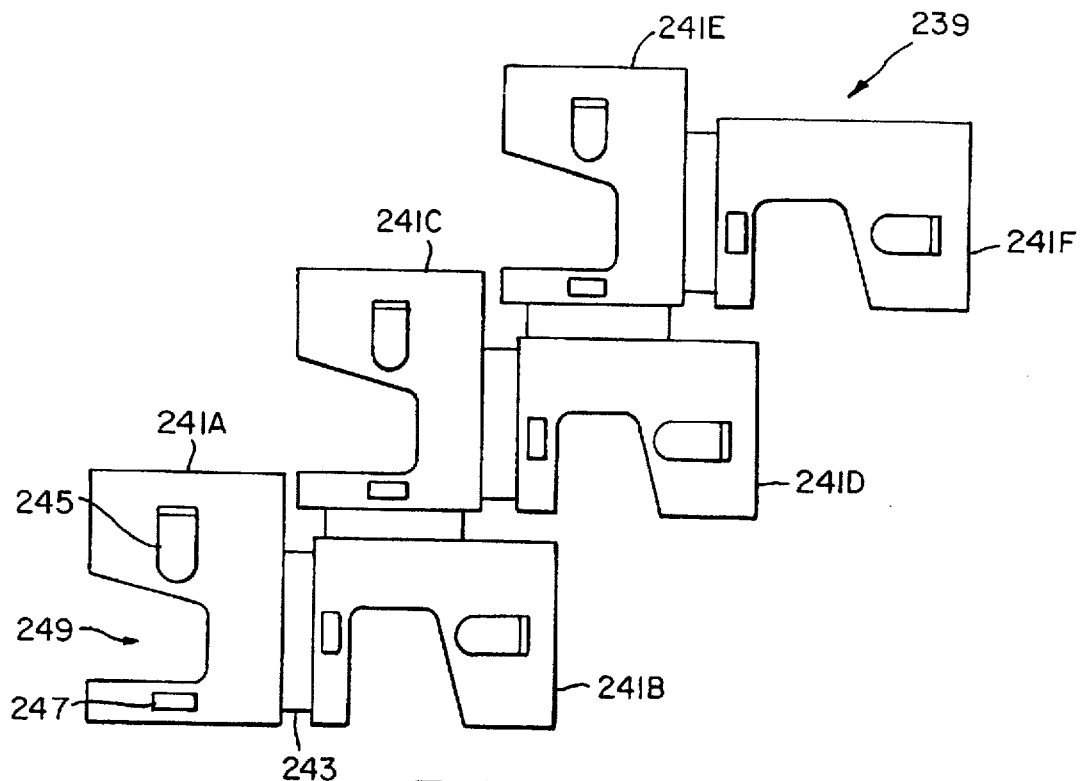
FIG. 17 is a perspective view of a printed circuit board apparatus according to one embodiment of the invention.

Alternatively, the detection circuit includes a printed circuit board (PCB) sensing apparatus. The PCB apparatus includes PCB materials which are constructed and arranged to provide a sensor set for at least one resilient mechanism. FIG. 17 shows a PCB apparatus 239 for the second embodiment shown in FIGS. 14–16. To construct the PCB apparatus, some standard PCB manufacturing techniques are employed. However, the order of steps, design and construction provide some unique characteristics which are intended to be within the scope of the invention.

First, a thick piece of PCB material or a set of PCB layers is routed or punched with a series of zigzagging lines having a width desired for a bending region. The thick piece or set of layers may contain one or more electrically conductive layers. Second, the PCB material is bonded to a thin piece of PCB material having at least one electrically conductive layer. The bonding operation is similar to the standard bonding operations used to produce multilayer PCB's common in today's electronic products.

Next, the resulting material is then processed further by having tracks etched into it, holes punched or drilled into it, and an outline either punched or routed. The tracks, holes and outlines processed into the PCB apparatus are in a predetermined pattern that locates circuit connections so that the PCB apparatus, when folded into a particular shape, provides component attachment locations for the sensor set components in appropriate positions relative to other structures as will be further discussed. Then, the sensor set components (e.g., the LED's and photodiodes) are installed on the PCB apparatus. Plastic holders are optionally used to hold both the LEDs and the photodiodes in place. The use of plastic holders provides the benefit of accurately locating the sensor set components on the PCB, as well as accurately locating the LEDs and photodiodes relative to each other. Finally, the PCB apparatus is folded into a particular shape. For example, in connection with the second embodiment, the PCB apparatus is folded around the formed base 201,203 so that the resilient mechanisms are disposed between the elements of the sensor sets.

The PCB apparatus provides advantages over other apparatus including providing more uniform construction, higher yields due to automation, and the ability to wavesolder components. Wavesoldering provides substantial cost savings over hand-soldering of components.

The resulting PCB apparatus has flexible sections, and rigid sections. As shown in FIG. 17, the PCB apparatus for the second embodiment includes six rigid sections 241A–241F and five flexible sections 243. The number of flexible and rigid sections can be altered according to the number of degrees of motion intended to be detected. Each rigid section 241 includes a notch 249 for a resilient mechanism. The PCB apparatus is folded around the cubed shaped base 201,203 so that the resilient mechanisms extending from the base pass through the notches 249 (i.e., pass between the sensor set elements). Accordingly, the mask portions 211 of the resilient mechanisms behave similarly to the shutters and the masking posts described above to control the amount of light reaching the photodiodes.

Figure 22:
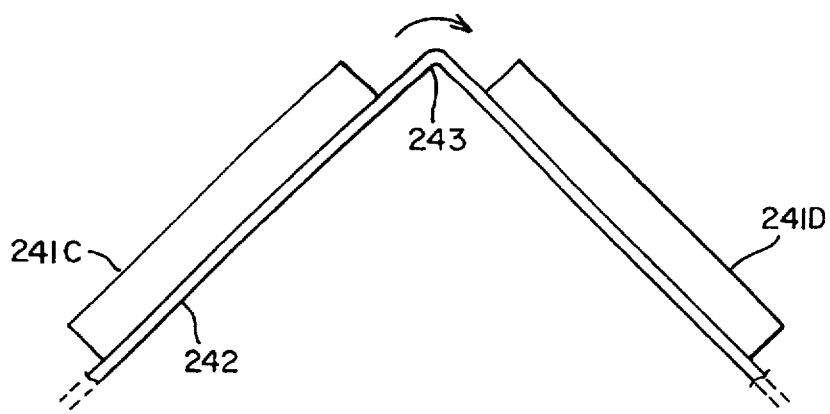
FIG. 22 is a cross-sectional view of a portion of a printed circuit board apparatus according to the invention.

FIG. 22 provides a cross-sectional view of a portion of the PCB apparatus 239 when bent into a predetermined position such as a right angle. Rigid sections 241C and 241D of the thick piece or set of layers of PCB material are bonded to the thin piece of PCB material 242. Components (not shown) are installed onto the rigid section. The PCB apparatus is then bent at the flexible portion 243 into the predetermined position. The arrow indicates that the direction of movement of the PCB apparatus 239 is away from the side of the thin piece of PCB material 242 having the bonded thick pieces or set of layers, the conductive layer being on the concave side of the bend.

Circuitry on the thin piece of PCB material 242, and optionally the thick piece of PCB material, enable the installed components to operate as an electrical circuit. In particular, the thick piece of PCB material may include multiple layers of circuitry.

The method of producing a PCB apparatus having both rigid portions and flexible portions provides an additional benefit of eliminating the need for connectors between circuit boards in some situations. In particular, rather than providing electrical connections between two circuit boards using a cable, a thin piece of clad PCB material may be bonded to thicker more rigid boards. Then, after the combination is etched, routed and/or drilled, the rigid pieces may be arranged so that they are positioned in their desired locations. Electrical continuity between the boards is maintained because the clad material withstands the bending forces applied when positioning the rigid pieces and does not crack.

The desirable characteristics for sensor sets are non-contact sensing to eliminate friction, the coupling of general planar displacement into responsive and non-responsive displacements, large sensed dynamic range, immunity to external influences, small size, high reliability, and low cost. (Sensed dynamic range is defined as the ratio as the largest sensed displacement to the smallest sensed displacement).

Assembly of the second embodiment will now be discussed. First, the base portions 201 and 203 are fitted together to form a complete base. For example, the two hemicubes shown in FIG. 14 are fitted together such as by snapping then into each other. Second, the PCB apparatus is "folded" around the base to form a mechanism subassembly. For example, the PCB apparatus is folded around the cube formed by the two hemicubes and clipped into place. Clipping is achieved by either using (1) detail molded into the inner cube, or (2) detail provided in some fashion in the PCB apparatus. Third, the mechanism subassembly is placed in the intervening member with cables to the PCB apparatus being placed through an orifice in the intervening member. For instance, the mechanism subassembly is placed into one of the inner ball halves so that the cables fit through the hole 224 as shown in FIG. 15. Then, the second inner ball half is fastened to the first one using the circlip 225 (the circlip 225 will rest in the equatorial valley mentioned earlier). Fourth, the movable member is assembled around the intervening member. For example, the outer ball shown in FIG. 16 is assembled over the inner ball by combining the two outer ball halves and fastening them with a circlip 237.

Numerous enhancements are anticipated and intended to be within the scope of the invention. For instance, the outer and inner ball halves may include edge detail that enables the halves to mate together conveniently. This provides the benefit of easier assembly.

Additionally, the method optionally includes the step of fitting a cover over the movable member. Preferably the cover is a rubber member that is stretched over the outer ball assembly. This provides benefits of reducing hand slippage when gripping the movable member, increasing hand comfort, protecting internal components, and providing aesthetics.

Figure 18:
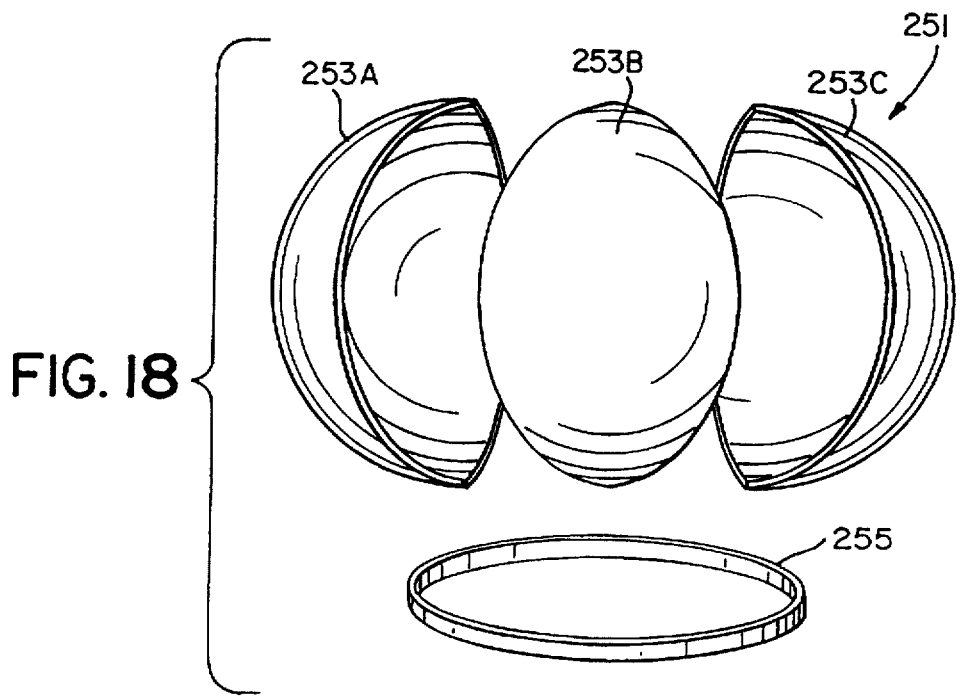
FIG. 18 is a perspective view of an outer ball structure of one embodiment of the invention.

Furthermore, FIG. 18 shows another embodiment of the grip 9, movable member 229, or the grip 99. Here, an outer ball 251 includes three ball portions 253A,253B,253C. The three ball portions may be each similar in shape or each unique in shape. FIG. 18 shows the outer ball 251 as having wedge-shaped ball portions for simplicity although in a preferred embodiment, the ball portions have curves and shapes more similar to the covering of a baseball. The outer ball portions further include receiving portions that receive the second ends of the resilient mechanisms. Additionally, the outer ball portion may include a plastic ring 255 to secure the portions together.

Figure 9:
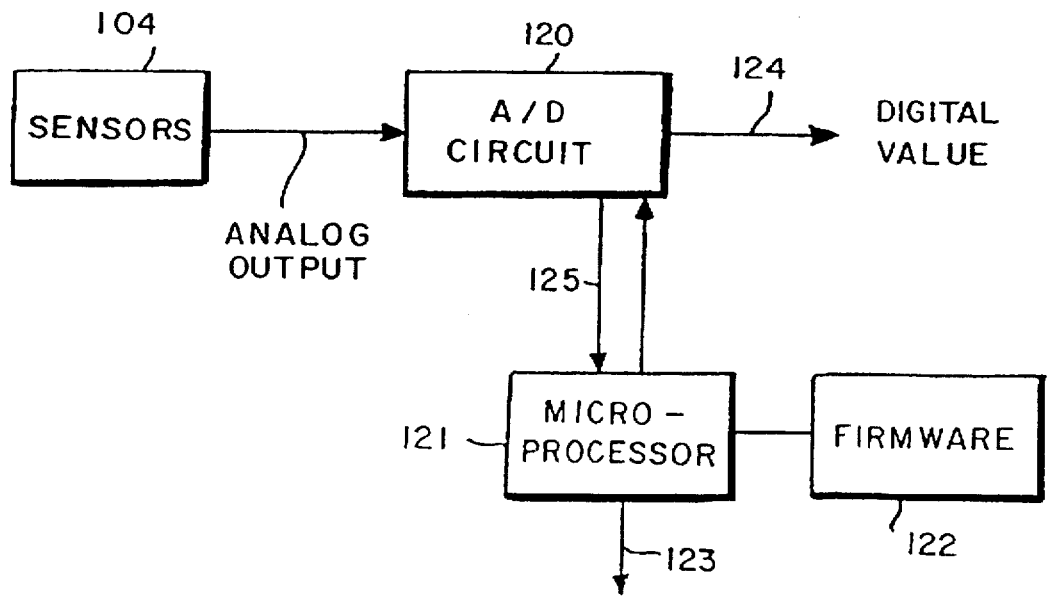
FIG. 9 is a logic-block diagram of an embodiment of the invention.

FIG. 9 is a logic-block diagram of a signal processing mechanism suitable for the invention. Analog output from sensors 104 is converted to a digital value by a dual-slope A/D circuit 120 controlled by a microprocessor 121 and firmware 122. The A/D conversion rate desirably matches or exceeds human response rates for suitable operation. Conversion rates of the order of 100 sets per second are suitable. The dual-slope technique provides a suitable conversion rate at very low cost. It will be apparent to those skilled in the art that other conversion techniques can be employed. In one embodiment of the invention the A/D circuit 120, microprocessor 121 and firmware 122 are placed in the space between grip 100 and base 99 (see FIG. 4). In another embodiment, however, the circuit, microprocessor and firmware is external to the apparatus.

It is desirable to obtain a sensitivity range at least as large as the comfortable operational range of the human hand. The largest detectable effort is determined by the effort required to achieve the largest detectable displacement. The smallest detectable effort is determined by summing the errors due to the hysteresis of the device, the environmental effects on the sensors (temperature, humidity, ageing, etc.) and the accuracy and stability of the sensing electronics while taking account of any compensation made by the control algorithm to minimize any error inducing characteristic.

Most prior art mice sense the velocity of a portion of the apparatus, e.g., a ball, to produce the image displacement. The scale factor for displacement of the image is based upon the magnitude of the velocity. The quality of the "feel" of an input device is dramatically impacted by the sensitivity curve relating the sensed input magnitude to the output. Prior art mice employ a relatively coarse curve, which is typically described by an input/output graph consisting of several "stairs."

In one embodiment of the invention, the sensitivity curve is implemented as a table look up function within the microprocessor 121 and firmware 122. In this fashion, greater flexibility is achieved, permitting a user to customize the operation of the input device to suit their particular taste. Thus, this embodiment receives signals on lines 125 from A/D circuit 120 and creates a representative output transmitted on line 123 (see FIG. 9) with the desirable sensitivity characteristics.

In one embodiment, a null region value and a set of 16 values is stored in a table within the firmware. By using a table whose size is a power of two, such as 16, bits of the binary representation of the applied force and torque, received from the conversion hardware, can index into the table. Linear interpolation is utilized for any received values falling between the 16 values.

The null region value defines the minimum sensed value which will result in a non-zero output. Any input of magnitude less than the null region is automatically zeroed. This prevents such effects as unwanted drifting from occurring due to hysteresis and other errors inherent in the device.

Figure 11:
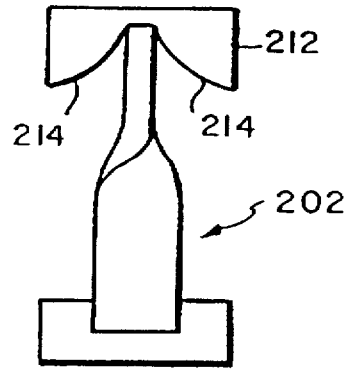
FIG. 11 is a front-view of a resilient mechanism for one embodiment of the invention.
Figure 12:
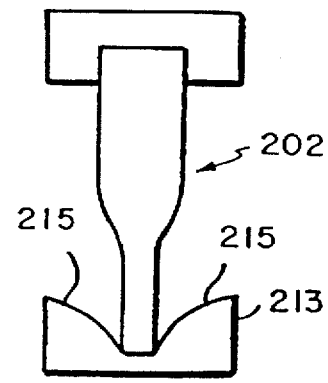
FIG. 12 is a side-view of a resilient mechanism for one embodiment of the invention.

Alternative embodiments of the present invention implement a desirable sensitivity curve in other portions of the hardware. For example, FIG. 11 is a front-view and FIG. 12 is a side-view of a resilient mechanism for one embodiment that attains a desirable sensitivity curve by utilizing resilient mechanisms with a non-linear response curve. The resilient mechanism 202 is constructed to provide higher resilience for weaker applied forces than for stronger ones. Thus, the apparatus provides more precision for smaller applied forces, and faster response for larger applied forces. As seen from the Figures, as the apparatus is displaced the mechanism 202 twists, much like that described for resilient mechanism 102. However, the surfaces 214 and 215 contacting the mechanism 202 effectively change in length, i.e., as the apparatus is displaced more surface contacts the mechanism. Thus the mechanism experiences a non-linear response curve.

Figure 13:
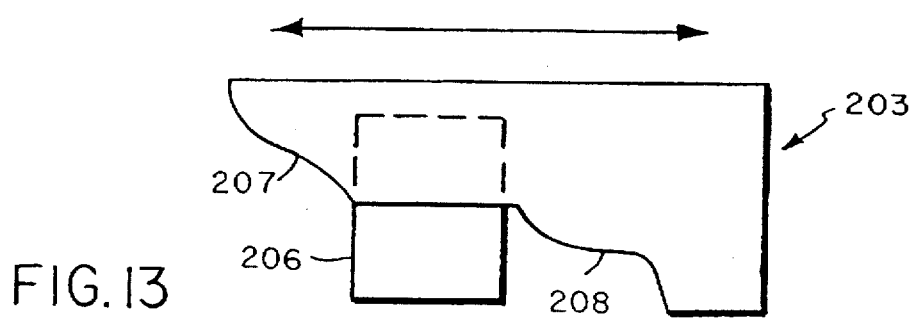
FIG. 13 is a view of a shadow mask for one embodiment of the invention.

In another embodiment, see FIG. 13, the sensing mechanism and corresponding shadow mask implements the desired sensitivity curve. FIG. 13 illustrates a shadow mask that can be used in a three-axis embodiment. Analogous structures can be built for two-axis embodiments. Shadow mask 203 is shown in at rest position. As the shadow mask is displaced in one direction, progressively less radiation is detected by photo-detector 206. As the mask is displaced in the other direction progressively more radiation is masked. Due to the non-linear curves 207 and 208, the amount of radiation detected has a non-linear relationship to the amount of displacement.

Some embodiments of FIGS. 11–12 and 13 transmit signal to A/D circuit 120, so as to provide a digital representation. The digital representation would retain the same desirable sensitivity characteristics inherent in the analog representation, i.e., microprocessor control would not be needed to create the desirable sensitivity curve. It is recognized, however, that some applications may be capable of directly utilizing the analog signal from sensors 104. Thus, A/D circuit 120, microprocessor 121, and firmware 122 should not be thought of as limitations to the present invention.

Figure 10:
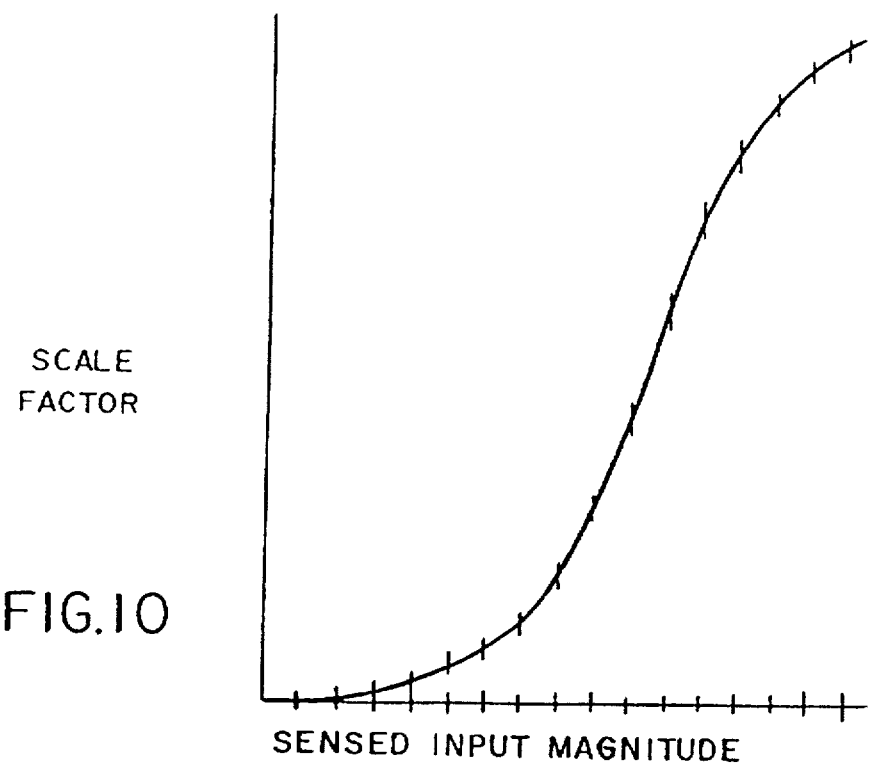
FIG. 10 is a graph of a sensitivity curve relating sensed input magnitude to a scale factor.

FIG. 10 displays a desirable sensitivity curve relating the sensed input magnitude to the scale factor. In one embodiment, the sensed input magnitude is the torque applied to the apparatus; in another embodiment, the sensed input magnitude is the force applied to the apparatus. Image manipulation benefits from a very large control dynamic range. A sensitivity curve of FIG. 10 results in the sense dynamic range being transformed into a much larger control dynamic range than that resulting from velocity control (defined for velocity control as the ratio of the maximum velocity to the minimum velocity) with high resolution at the low end and low resolution at the high end. This type of sensitivity curve results in a significantly improved "feel" of operation compared with linear operation devices.

Figure 19:
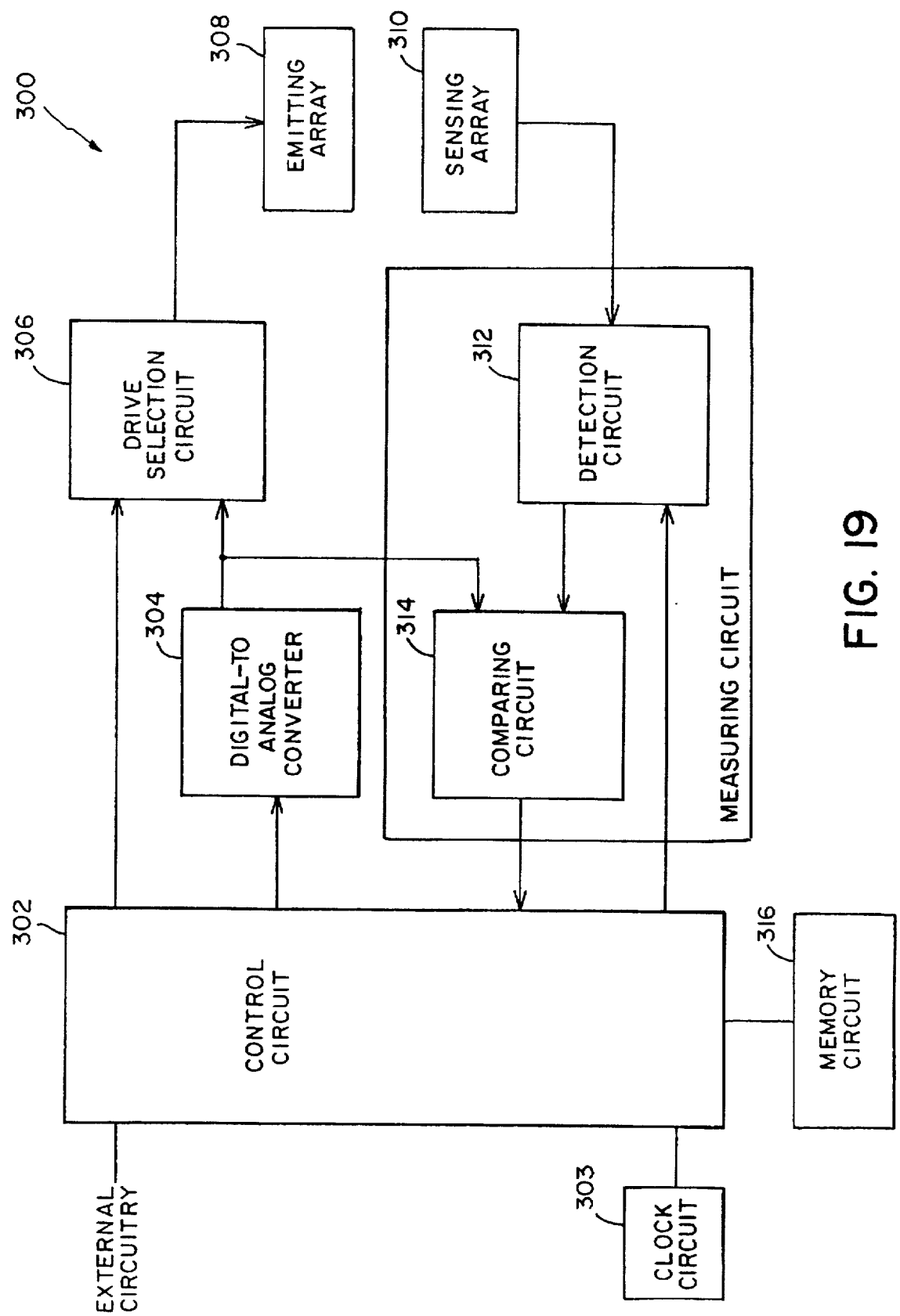
FIG. 19 is a block diagram of a signal processing mechanism of one embodiment of the invention.

Another embodiment of a signal processing mechanism suitable for the invention is shown in FIG. 19. Sensor sets are configured so that the LEDs of each sensor set belongs to an emitting array 308, and the photodiode of each sensor set belongs to a sensing array 310. The signal processing mechanism 300 is formed as follows. A clock circuit 303 generates a clock signal for a control circuit 302. The control circuit 302 provides a respective output to each of a digital-to-analog converter circuit 304, a drive selection circuit 306, and a detection circuit 312. The drive selection circuit 306 further receives an output from the digital-to-analog converter circuit 304, and provides an output to the emitting array 308. The detection circuit 312 further receives an output from the sensing array 310, and provides an output to a comparing circuit 314. The comparing circuit 314 further receives the output from the digital-to-analog converter circuit 304 and provides an output to the control circuit 302.

The control circuit 302 is implemented using a microcontroller, or alternatively as dedicated control logic in which case the control circuit 302 further includes communication circuitry for interfacing with an external microcontroller.

The operation of the signal processing circuit 300 will now be explained. The control circuit 302 operates in two phases, a drive phase and a measuring phase. During the drive phase, the control circuit 302 activates an LED of the emitting array 312 so that emissions are directed towards a corresponding a photodiode of the sensing array 310. The photodiode provides a result signal according to a position of a mask disposed between the LED and photodiode. The result is temporarily stored by the detecting circuit 312. During the measuring phase, the control circuit determines the value of the stored result and provides a signal indicative of the stored result. The signal is ultimately indicative of the force and torque applied to the movable member relative to the base since this results in displacement of a resilient mechanism having the mask, which in turn affects the amount of emissions received by each photodiode.

Storage of the result in the detecting circuit provides benefits such as permitting the LED to be turned off quickly to minimize power consumption, and freeing up the DAC circuit 304 for use in the measuring phase.

The above-described operation of the signal processing apparatus activates one LED at a time. However, the apparatus can easily be modified to activate a group of LEDs at a time. In particular, each photodiode that corresponds to an activated LED of the group must have access to a sample and hold circuit to temporarily store a result which will later be determined serially by the control circuit 302. This provides a benefit of reducing the number of drive phases.

In particular, during the drive phase, the control circuit 302 provides a first control signal to the digital-to-analog converter circuit 304, and a second control signal to the drive selection circuit 306. The digital-to-analog converter circuit 304 provides an analog signal to the drive selection circuit 306 according to the first control signal. The drive selection circuit 306 activates an LED of the emitting array 308 according to the second control signal. As will be later described, the analog signal controls the emission intensity of the activated LED. The sensing array 310 samples emissions from the activated LED of the emitting array 308. The detection circuit 312 stores temporarily a signal provided by the sensing array 310, the signal being indicative of the sampled emissions.

During the measuring phase, the comparing circuit 314 receives the stored signal from the detection circuit 312, receives a series of test signals from the digital-to-analog converter circuit 304, and provides a comparison signal to the control circuit 302 indicative of a comparison between the stored signal and each of the series of test voltages. The control circuit 302 controls the generation of the series of test voltages by providing the first control signal to the digital-to-analog converter circuit 304. The control circuit 302 provides an electronic representation of the force and torque to the movable member according to the comparison signal received from the comparing circuit 314.

Before the comparison of the stored signal and the series of test signals is performed, the signal to be stored requires a settling period due to capacitances in the drive selection circuit, the emitting array, the sensing array, and the detection circuit. The combined capacitances of the non-tested photodiodes of the sensing array 310 contribute significantly to the settling time. To reduce unwanted capacitance, the control circuit 302 optionally provides a third control signal to the detection circuit 312 that isolates some of the non-tested photodiodes thereby reducing the settling time.

The control circuit 302 controls the operation of each sensor set so that each sensor set provides a similar response. This is achieved through calibration of the apparatus so that the control circuit 302 accounts for variances in sensor set loss factors by inducing each sensor set to provide a similar result for similar mask displacements. Accordingly, the control circuit 302 sends signals to the digital-to-analog converter 304 to provide the LED of each sensor set of the emitting array 308 with an appropriate amount of current to minimize the significance of variations in the components of each sensor set on the operation of the invention.

The drive selection circuit 306 enables the control circuit 302 to activate each LED or a group of LEDs of the emitting array separately. This provides a benefit of reducing the amount of power consumed during operation of the invention. Another benefit is that this reduces the need for some complex circuitry. For instance, by driving only one LED at a time, the signal processing circuit 300 avoids the need for a multiplexor to multiplex the outputs of the photodiodes. The detection circuit 312 includes a sample and hold circuit to store the output voltage of the sensing array.

During the measuring phase, the control circuit 302 applies the first control signal to the digital-to-analog converter circuit 304 to generate a series of test voltages. This series may be an incrementing or decrementing series but is preferably a series of midpoint voltages that enable the control circuit 304 to perform successive approximations to more quickly determine the value of the stored voltage. For instance, if there are 1024 possible values, the control circuit begins the measuring phase by operating the digital-to-analog converter circuit 304 and the comparing circuit so that the stored value is compared with the 512th value. Then, the control circuit compares the stored value with either the 256th value (i.e., the midpoint between the 1st and 512th values) or the 768th value (i.e., the midpoint between the 512th and 1024th values) depending on the result of the comparison, and so forth, until the control circuit determines the stored value. The successive approximation approach provides a benefit of quickly determining the stored value.

To control the emitting array so that the output of each LED is uniform, the invention provides for a method of calibration. The invention is calibrated by first placing the optical masks (e.g., the masking portions 211 of the resilient mechanisms of the second embodiment) at a default location (e.g., their midpoints, or at a hysteresis position of minimum stress). Then, the LEDs are driven in digital increments until the output of each sensor set (i.e., the output of the corresponding photodiode) provides a reading close to a predetermined value. The predetermined value may be a previously calculated nominal operating value or more preferably a value close to the midrange of possible values (e.g., the 512th value of 1024 possible values). The values are then stored in a memory (not shown) accessible by the control circuit.

Next, the optical masks are displaced a known distance, and the delta between the displaced position and the midpoint reading is measured and used to determine a scaling factor. For example, in normal operation, a set of 'zero' readings is taken at some point to define the 'zero' position. To detect displacement from this position, a set of new readings is taken. Then, the 'zero' readings are subtracted from the new readings. The result is then multiplied by the scale factors to derive calibrated displacement values.

The signal processing circuit 300 includes a memory 316 (see FIG. 19) for storing the calibration information. The control circuit 302 accesses the calibration information in the memory 316 during the driving phase to determine an LED drive current, and during the measuring phase to determine the settling time required before the sensing array result is to be tested. In particular, a dedicated register is used for storing the settling time.

The above described circuit provides a benefit of alleviating the need for an analog-to-digital converter to decode signals from the sensing array 310 into digital values. Instead, the digital-to-analog converter 304 is used in both the driving and measuring phases. In particular, during the measuring phase, the digital-to-analog converter 304 operates in combination with both the detection circuit 312 and the comparing circuit 314 to enable the control circuit 302 to determine the value of the signal from the sensing array 310.

Additionally, the signal processing circuit 300 may include interface circuitry such as I²C or USART circuitry, and preferably serial peripheral interface circuitry commonly used by devices such as non-volatile RAMs, for communicating with other devices. For instance, the signal processing circuit 300 may be coupled to an external processing device.

Figure 21:
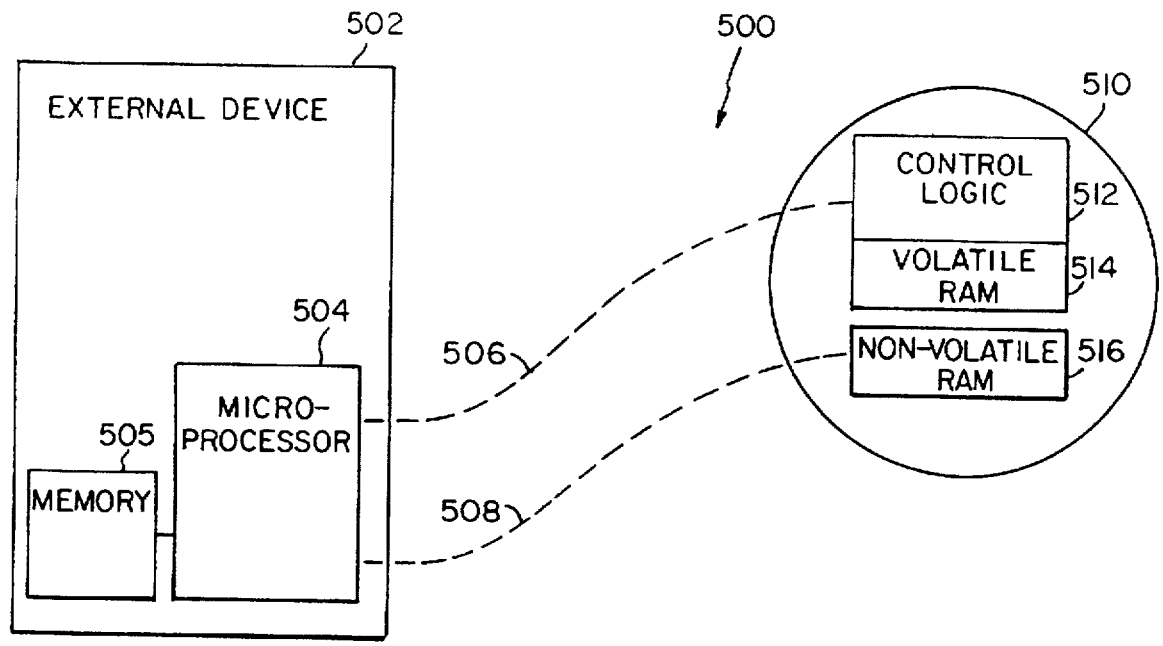
FIG. 21 is a block diagram of one embodiment of the invention.

An exemplary force and torque converting system 500 is shown in FIG. 21 according to an embodiment of the invention. An external device 502 includes a microcontroller 504 and memory 505. Force and torque converter 510 includes control logic 512 (such as the circuitry shown in FIG. 19) which includes volatile RAM 514 (e.g. memory 316 in FIG. 19), and non-volatile RAM 516. The control logic 512 is coupled to the microcontroller 504 through connection 506. The non-volatile RAM is coupled to the microcontroller 504 through connection 508. Alternatively, the microcontroller 504 uses a single connection to communicate with both the control circuit 512 and the non-volatile RAM 516.

The non-volatile RAM 516 stores calibration information. In particular, the non-volatile RAM includes the LED calibration values that control the drive currents for the LEDs of the emitting array 308. Additionally, the non-volatile RAM includes a settling time value that indicates a length of time the control circuit 302 should allow signals from the sensing array to settle before determining their value. Furthermore, the non-volatile RAM includes the scale factors for use by the microcontroller 504 of the external device 502 to scale the electronic signal received from the force and torque converter 510.

Also, the non-volatile RAM stores the RC network adjustment value or values.

When the device is started, the microcontroller 504 reads the calibration information from the non-volatile RAM 516. The microcontroller relays some of the calibration information to the control logic 512 which stores the relayed information in the volatile RAM 514. In particular, the microcontroller relays the LED calibration values, the settling time value, and the RC oscillator information to the control logic 512 and stores the scale factors in the memory 505. This provides the benefit of quicker access, and more reliable access to the calibration values. For example, the control logic 412 accesses the volatile RAM 512 at memory access speeds rather than serial communication interface speeds. Furthermore, higher reliability is achieved due to less noise received during each access since the adjacent memories provide shorter electrical distances.

Preferably, the control logic 510 includes one or more of the circuits shown in FIG. 19 on a single application specific integrated circuit (ASIC). Additionally, the ASIC includes the above-described interface circuitry that enables the ASIC to conveniently interface with an external device 502 such as microcontroller 504.

Figure 20:
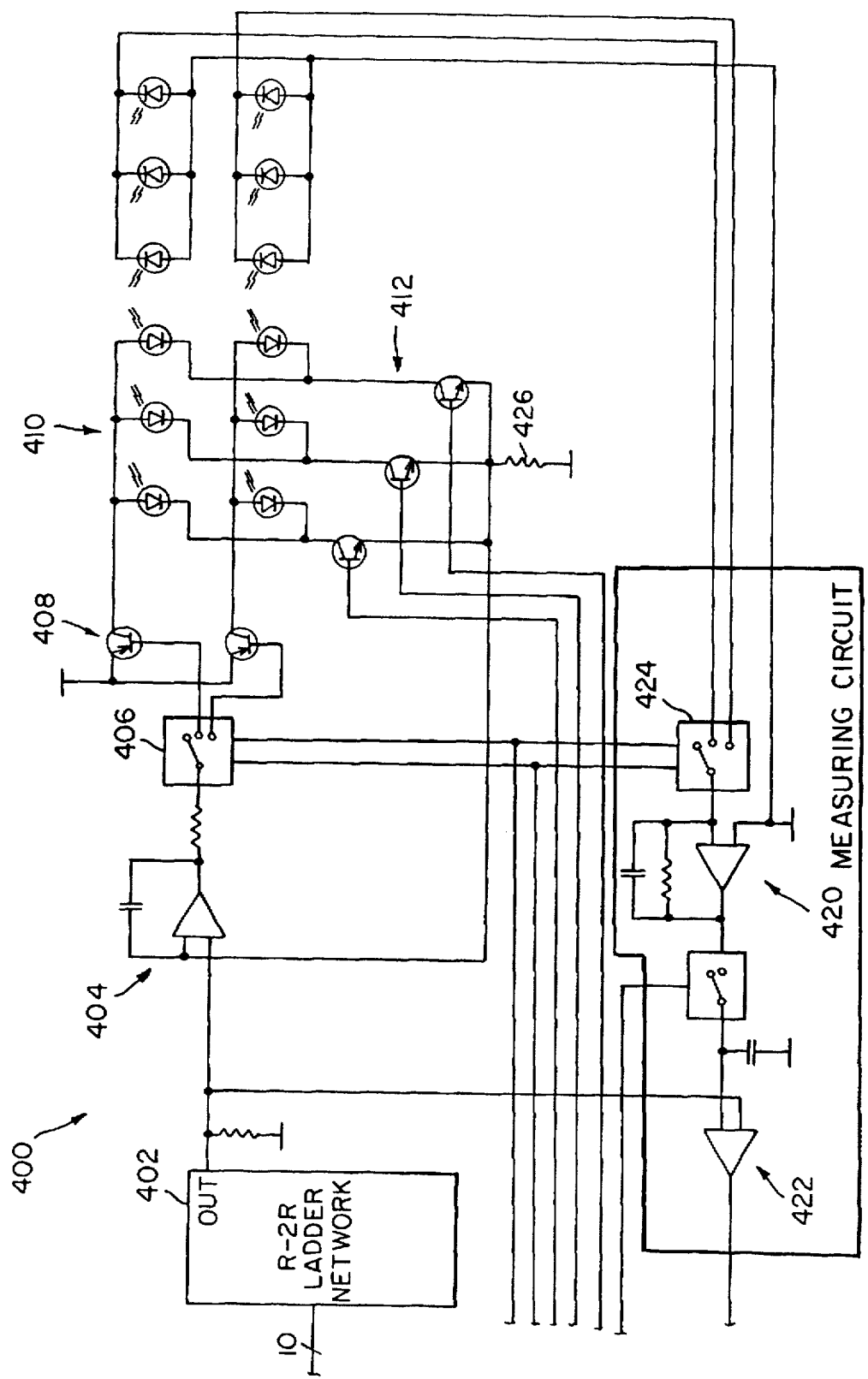
FIG. 20 is a circuit diagram of a signal processing mechanism of one embodiment of the invention.

FIG. 20 shows an embodiment of a signal processing circuit 400. In particular, an LED drive circuit includes a digital-to-analog converter (DAC) 402 such as an R-2R ladder network, an op-amp circuit 404, an analog multiplexor 406, a series of LED drive control transistors 408, an array of LEDs 410, and a series of sink transistors 412, and optionally a multiplexor 424. A sense circuit includes an op-amp circuit 420, the DAC 402, a voltage comparator 422.

Operation of the FIG. 20 embodiment is similar to the operation of the embodiment shown in FIG. 19. In particular, a reading is taken by placing the required LED drive digital value to the DAC 402, multiplexing the output of the DAC 402 to the required LED drive control transistor which in turn drives the current to a row of LEDs, turning on one of the LED sink transistors which sinks current from a column of LEDs. Accordingly, one LED is turned on with a constant current as specified by the digital LED drive current value. If an analog multiplexor is used in the sense circuit, it is set to connect the appropriate row of photodiodes to the op-amp 420. After a brief settling period, the voltage out of the op-amp 420 is sampled-and-held and the LED drive source and sink transistors are turned off. As in the embodiment shown in FIG. 19, the embodiment of FIG. 20 performs a measure phase using a successive approximation technique to measure the stored voltage.

Numerous improvements may be made which are intended to be within the scope of the invention. For instance, in connection with the embodiment of FIG. 20, an extra sensor set (i.e., an extra LED and photodiode) and op-amp in the LED drive feedback loop may be substituted for the resistor 426. The LED drive digital value would then be used to specify the current generated by the feedback photodiode. In this case, the invention would then exhibit temperature insensitivity because the feedback sensor set would adjust the LED drive current to ensure consistent photodiode generated currents.

In another embodiment of the invention, the control circuit is in the form of a microcontroller, and the digital-to-analog converter circuit is in the form of an R-2R resistor ladder. Preferably, the microcontroller and R-2R ladder network are combined on a single integrated circuit (IC). This provides benefits of reducing both cost and space.

The clock circuit for the control circuit may take the form of either a crystal, ceramic resonator or an RC network. In a preferred embodiment, the clock circuit is incorporated in the IC containing the control circuit, and has either a programmable R, a programmable C, or both. The clock circuit is calibrated to a known clock frequency by storing the value to program the R and/or C in a register(s). This is particularly convenient in the embodiment that already has access to non-volatile RAM for storing LED calibration values. Accordingly, when the microcontroller starts up, the RC network will oscillate at some frequency. The microcontroller will then read the clock calibration value or values from the external non-volatile RAM, and set the RC network to oscillate at the preferred frequency. This provides the benefit of maintaining higher tolerances as compared to RC networks with non-programmable components, and saves two pins of the IC that contains the control circuit. Additionally, this solution is implementable at a low cost.

Having thus described several particular embodiments of the invention, various alterations, modifications, and improvements will readily occur to those skilled in the art.

Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. A device for providing a detection signal in response to a drive signal for driving a plurality of first sensor components, the device comprising:

a control circuit having a first output that provides a digital control signal, a first input for receiving a comparison signal, and a second output that provides the detection signal according to the comparison signal;

a digital-to-analog converter having an input coupled to the first output of the control circuit, and an output that provides the drive signal in response to the digital control signal; and a measuring circuit having a first input coupled to the output of the digital-to-analog converter, a second input that receives a result signal from a plurality of second sensor components co-acting with the plurality of first sensor components, and an output coupled to the first input of the control circuit that provides the comparison signal, wherein the digital control signal provided by the control circuit has a first drive value during a first time interval to drive the plurality of first sensor components, and a plurality of comparison values during a second time interval to measure a result value of the result signal.

2. The device of claim 1, wherein the measuring circuit includes:

a sample-and-hold circuit having an input coupled to the second input of the measuring circuit that receives the result signal, and an output that provides a temporarily stored signal indicative of the result signal; and a comparator having a first input coupled to the first input of the measuring circuit, a second input coupled to the output of the sample-and-hold circuit that receives the temporarily stored signal, and an output coupled to the output of the measuring circuit.

3. The device of claim 2, wherein the control circuit further includes a third output, and wherein the measuring circuit further includes:

a multiplexor interconnected between the second input of the measuring circuit and the input of the sample-and-hold circuit, the multiplexor having a first input coupled to the third output of the control circuit, a second input coupled to the second input of the measuring circuit, and an output coupled to the input of the sample-and-hold circuit.

4. The device of claim 1, wherein the control circuit further includes a fourth output, and the device further includes:

a drive selection circuit having a first input coupled to the fourth output of the control circuit, a second input coupled to the output of the digital-to-analog converter, and an output that selects one of the plurality of first sensor components and applies the drive signal to the selected one of the plurality of first sensor components.

5. The device of claim 4, wherein the control circuit further includes a second input, and the device further includes:

a memory coupled to the second input of the control circuit, for storing a plurality of calibration values, each calibration value defining a drive value of the digital control signal for each of the plurality of first sensor components, wherein the first drive value is defined by one of the plurality of calibration values.

6. The device of claim 1, wherein the control circuit, the digital-to-analog converter, and the measuring circuit are integrated within a semiconductor component.

7. The device of claim 6, further including:

an interface circuit coupled to the second output of the control circuit, for providing the detection signal to an external device.

8. The device of claim 1, wherein each of the plurality of first sensor components corresponds to one of the plurality of second sensor components to form a plurality of sensor sets, and wherein the first drive value is one of a plurality of drive values that control the drive signal so that each sensor set provides a similar response.

9. The device of claim 8, wherein the control circuit is arranged to alternate the digital control signal between the plurality of comparison values and one of the plurality of drive values in a time multiplexed manner.

10. The device of claim 1, further comprising the plurality of first sensor components, and the plurality of second sensor components, one of the plurality of first sensor components being driven by the drive signal when the digital control signal has the first drive value during the first time interval.

11. A device for providing a detection signal in response to a drive signal for driving a plurality of first sensor components, the device comprising:

a control circuit having a first output that provides a digital control signal, a first input for receiving a comparison signal, and a second output that provides the detection signal according to the comparison signal;

a digital-to-analog converter having an input coupled to the first output of the control circuit, and an output that provides the drive signal in response to the digital control signal; and means, coupled to the first input of the control circuit, for providing the comparison signal according to a comparison of the analog signal of the digital-to-analog converter and a result signal from a plurality of second sensor components co-acting with the plurality of first sensor components, wherein the digital control signal provided by the control circuit has a first drive value during a first time interval to drive the plurality of first sensor components, and a plurality of comparison values during a second time interval to measure a result value of the result signal.

12. The device of claim 11, wherein the control circuit further includes a third output, and the means for providing includes:

means, coupled to the third output of the control circuit, for isolating at least one of the plurality of second sensor components to reduce a settling time of the result signal.

13. The device of claim 11, wherein the control circuit further includes a second input, and the device further includes:

a memory coupled to the second input of the control circuit, for storing a plurality of calibration values, each calibration value defining a drive value of the digital control signal for each of the plurality of first sensor components, wherein the first drive value is defined by one of the plurality of calibrated values.

14. The device of claim 11, wherein each of the plurality of first sensor components corresponds to one of the plurality of second sensor components to form a plurality of sensor sets, and wherein the first drive value is one of a plurality of drive values that control the drive signal so that each sensor set provides a similar response.

15. The device of claim 14, wherein the control circuit is arranged to alternate the digital control signal between the plurality of comparison values and one of the plurality of drive values in a time multiplexed manner.

16. The device of claim 11, further comprising the plurality of first sensor components, and the plurality of second sensor components, one of the plurality of first sensor components being driven by the drive signal when the digital control signal has the first drive value during the first time interval.

17. An apparatus for providing an electronic signal in response to at least one of an applied force and an applied torque, the apparatus comprising:

a base;

a movable member that provides movement relative to the base in response to the at least one of an applied force and an applied torque;

a controlling mechanism connected to the base and co-acting with the movable member to control the movement of the movable member relative to the base; and a detection device that detects the movement of the movable member relative to the base, and provides the electronic signal, by driving a plurality of first sensor components, the detection device including:

a control circuit having a first output that provides a digital control signal, a first input for receiving a comparison signal, and a second output that provides a detection signal, as the electronic signal, according to the comparison signal, a digital-to-analog converter having an input coupled to the first output of the control circuit, and an output that provides the drive signal in response to the digital control signal, and a measuring circuit having a first input coupled to the output of the digital-to-analog converter, a second input that receives a result signal from a plurality of second sensor components co-acting with the plurality of first sensor components, and an output coupled to the first input of the control circuit that provides the comparison signal, the plurality of first sensor components and the plurality of second sensor components co-acting with the controlling mechanism, wherein the digital control signal provided by the control circuit has a first drive value during a first time interval to drive the plurality of first sensor components, and a plurality of comparison values during a second time interval to measure a result value of the result signal.

18. The apparatus of claim 17, wherein controlling mechanism includes a plurality of resilient mechanisms, and wherein at least a portion of the detection circuit includes:

a plurality of rigid members, each rigid member supporting at least one of the plurality of first sensor components and the plurality of second sensor components, the plurality of rigid members and the plurality of resilient members being disposed around the base so that the at least one sensor component supported by each rigid member is aligned in a predetermined orientation relative to one of the plurality of resilient mechanisms of the controlling mechanism.

19. The apparatus of claim 17, wherein each of the plurality of first sensor components corresponds to one of the plurality of second sensor components to form a plurality of sensor sets, and wherein the first drive value is one of a plurality of drive values that control the drive signal so that each sensor set provides a similar response.

20. The apparatus of claim 19, wherein the control circuit is arranged to alternate the digital control signal between the plurality of comparison values and one of the plurality of drive values in a time multiplexed manner.

21. The apparatus of claim 17, further comprising the plurality of first sensor components, and the plurality of second sensor components, one of the plurality of first sensor components being driven by the drive signal when the digital control signal has the first drive value during the first time interval.

* * * * *